United States Patent
Ozaki

(10) Patent No.: US 9,973,686 B2
(45) Date of Patent: *May 15, 2018

(54) IMAGE CAPTURING CONTROL APPARATUS, IMAGE CAPTURING CONTROL METHOD TO CONTROL DISPLAY BASED ON USER INPUT

(71) Applicant: SONY CORPORATION, Tokyo (JP)

(72) Inventor: Koji Ozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/347,124

(22) Filed: Nov. 9, 2016

(65) Prior Publication Data

US 2017/0251141 A1    Aug. 31, 2017

Related U.S. Application Data

(63) Continuation of application No. 14/390,593, filed as application No. PCT/JP2013/004642 on Jul. 31, 2013, now Pat. No. 9,521,313.

(30) Foreign Application Priority Data

Aug. 7, 2012    (JP) .................................. 2012-174794

(51) Int. Cl.
*H04N 5/232*    (2006.01)
*G06F 3/0481*   (2013.01)
(Continued)

(52) U.S. Cl.
CPC ....... *H04N 5/23216* (2013.01); *G06F 3/0482* (2013.01); *G06F 3/0485* (2013.01);
(Continued)

(58) Field of Classification Search
CPC ............ G06F 3/04842; G06F 3/04847; H04N 5/23216
See application file for complete search history.

(56) References Cited

U.S. PATENT DOCUMENTS 7,034,881 B1    4/2006 Hyodo et al.
2005/0007456 A1*  1/2005 Lee ................... H04M 1/72577
                                                   348/207.99
(Continued)

FOREIGN PATENT DOCUMENTS

EP    1832958 A2    9/2007
EP    2405299 A2    1/2012
(Continued)

OTHER PUBLICATIONS

International Search Report and Written Opinion of PCT Application No. PCT/JP2013/004642, dated Dec. 4, 2013, 10 pages.

*Primary Examiner* — Amy Hsu
(74) *Attorney, Agent, or Firm* — Chip Law Group

(57) ABSTRACT

An information processing system that detects that a first user input is received at a user interface corresponding to a display configured to display an image captured by an image capturing unit; determines a status of a timer corresponding to the user interface upon detecting the first user input; controls an image capture operation of the image capturing unit upon detecting the first input and determining that the status of the timer satisfies a first predetermined condition; and controls the display to display an image condition settings menu upon detecting the first input and determining that the status of the timer satisfies a second predetermined condition.

20 Claims, 35 Drawing Sheets

(51) Int. Cl.
*G06F 3/0482* (2013.01)
*G06F 3/0488* (2013.01)
*G06F 3/0485* (2013.01)

(52) U.S. Cl.
CPC ........ *G06F 3/0488* (2013.01); *G06F 3/04817* (2013.01); *H04N 5/23245* (2013.01); *H04N 5/23293* (2013.01)

(56) References Cited

U.S. PATENT DOCUMENTS

| | | | |
|---|---|---|---|
| 2007/0205992 A1 | 9/2007 | Gloyd et al. | |
| 2007/0229669 A1* | 10/2007 | Yamamoto | H04N 5/232 348/207.99 |
| 2009/0015703 A1* | 1/2009 | Kim | G03B 29/00 348/333.12 |
| 2010/0156941 A1 | 6/2010 | Seung | |
| 2010/0208107 A1* | 8/2010 | Nonaka | G06F 1/1626 348/240.99 |
| 2011/0230228 A1* | 9/2011 | Young | G08C 17/02 455/550.1 |
| 2012/0011456 A1* | 1/2012 | Noda | G03B 17/40 715/769 |
| 2013/0258122 A1* | 10/2013 | Keane | H04N 5/23258 348/208.4 |

FOREIGN PATENT DOCUMENTS

| | | |
|---|---|---|
| EP | 2442552 A1 | 4/2012 |
| JP | 2006-050419 A | 2/2006 |

* cited by examiner

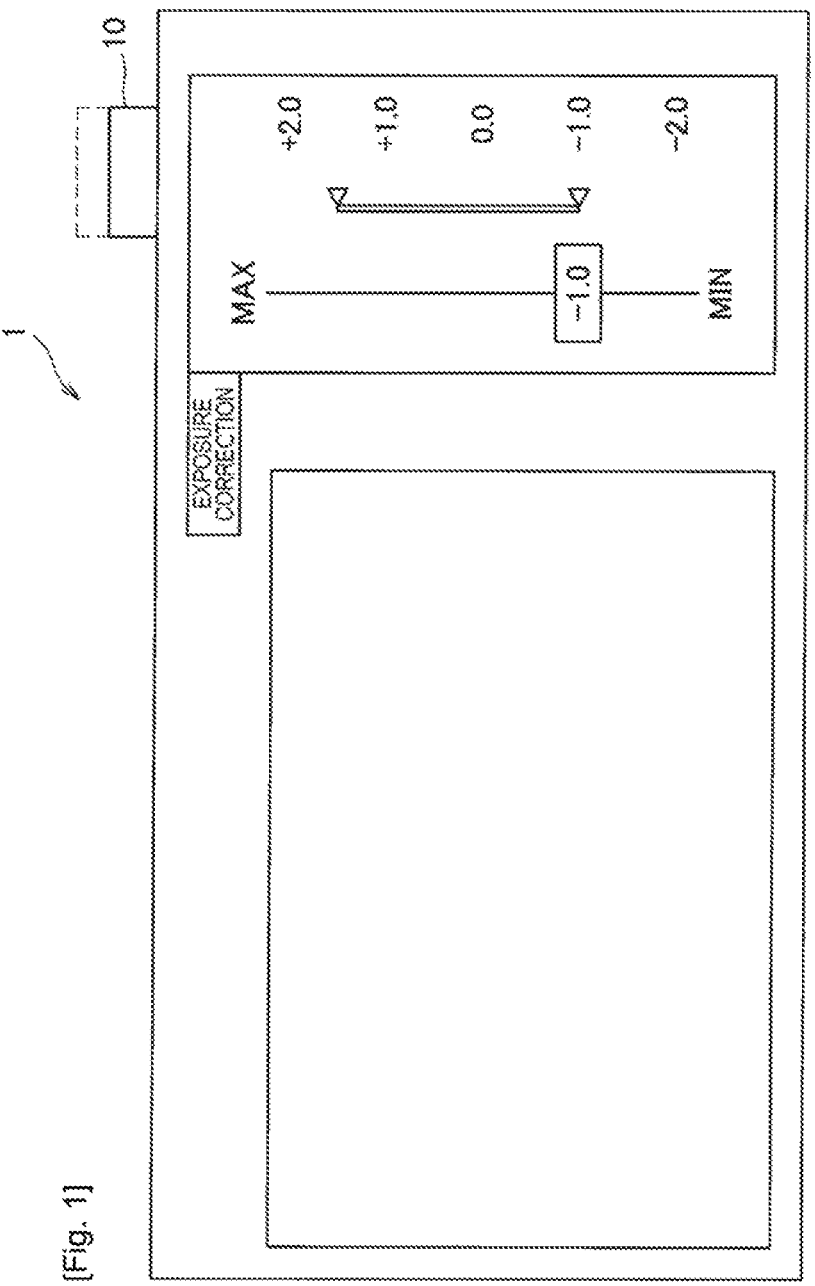

[Fig. 2A]
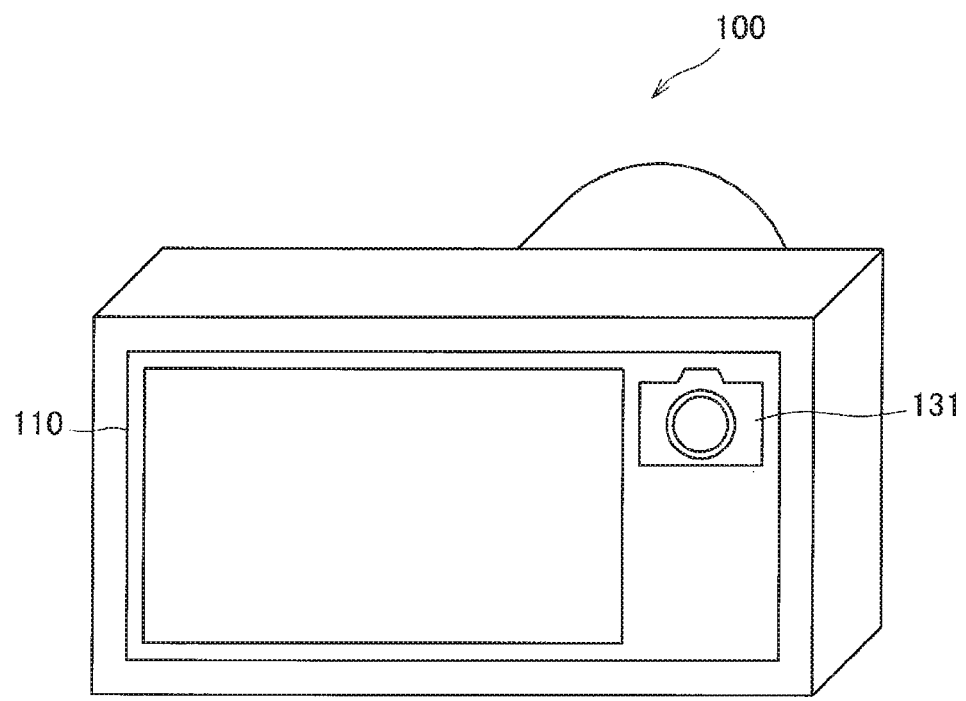

[Fig. 2B]
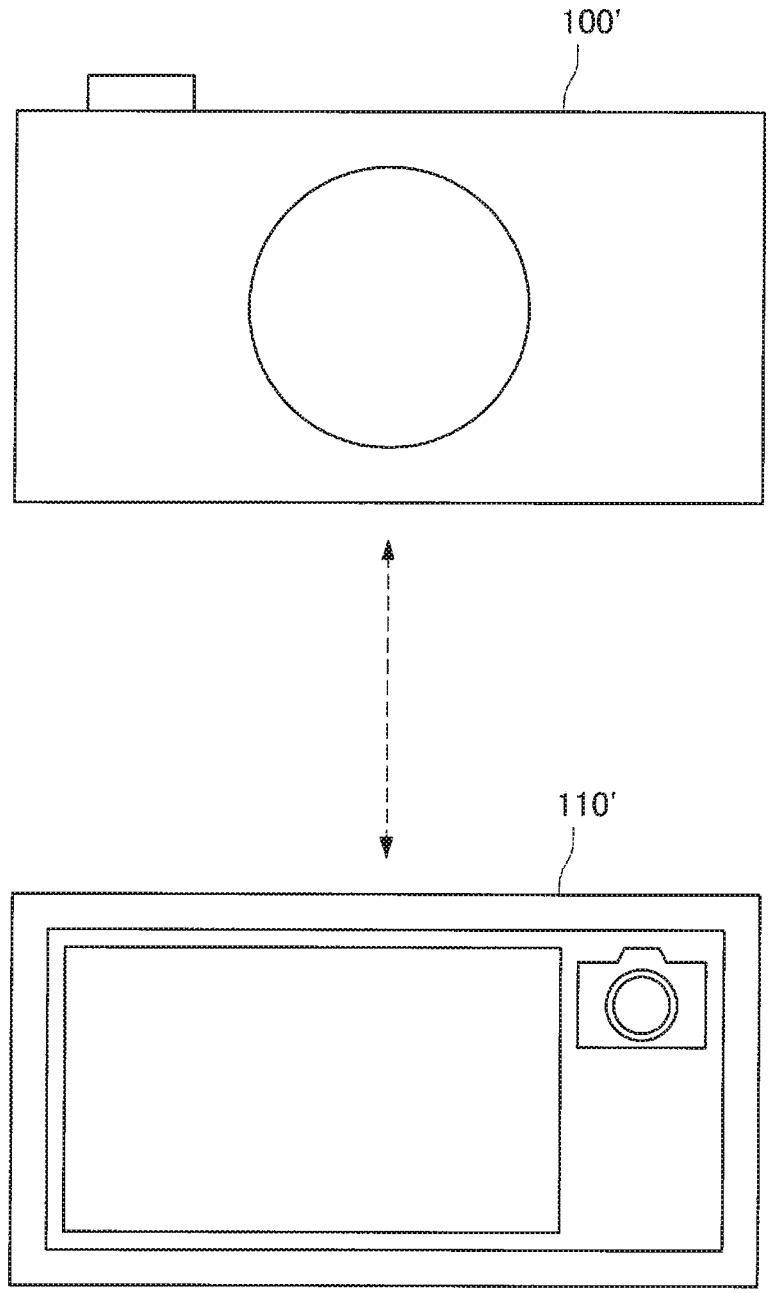

[Fig. 2C]
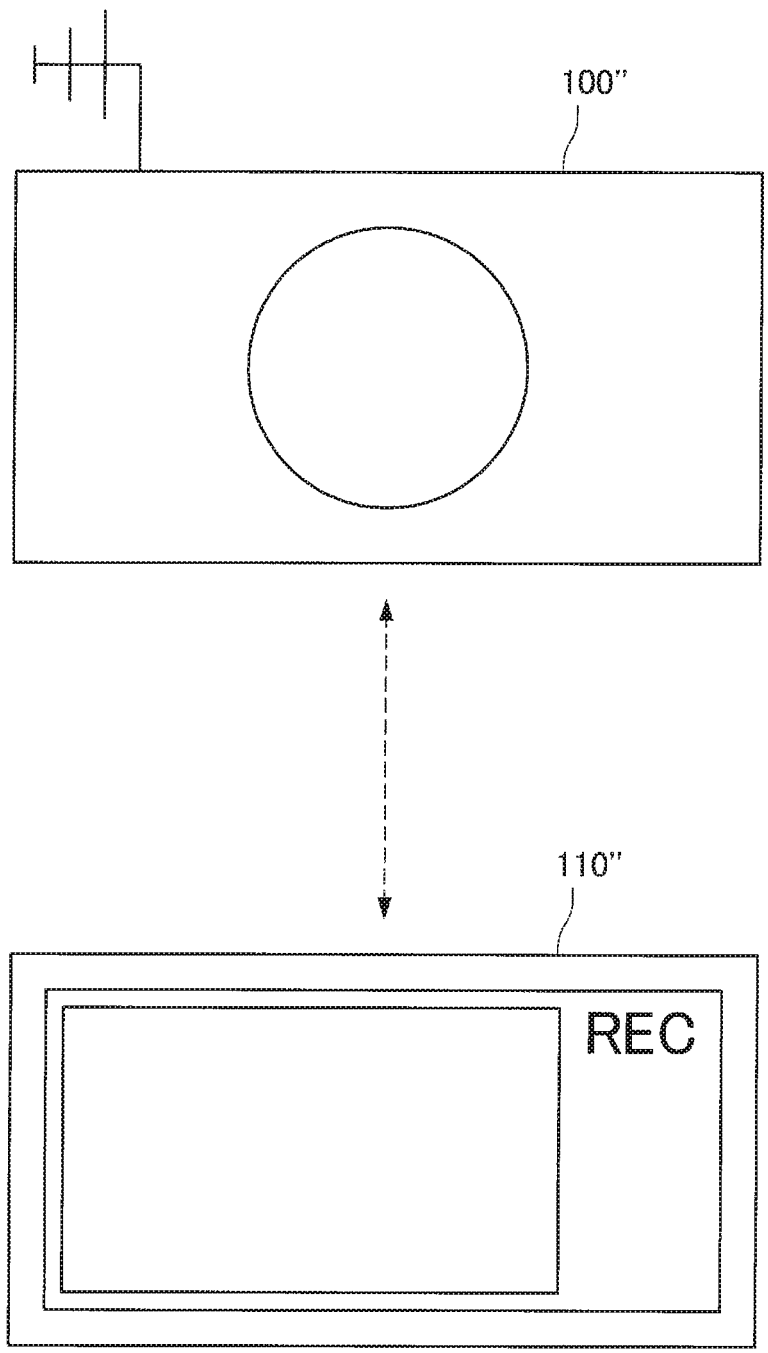

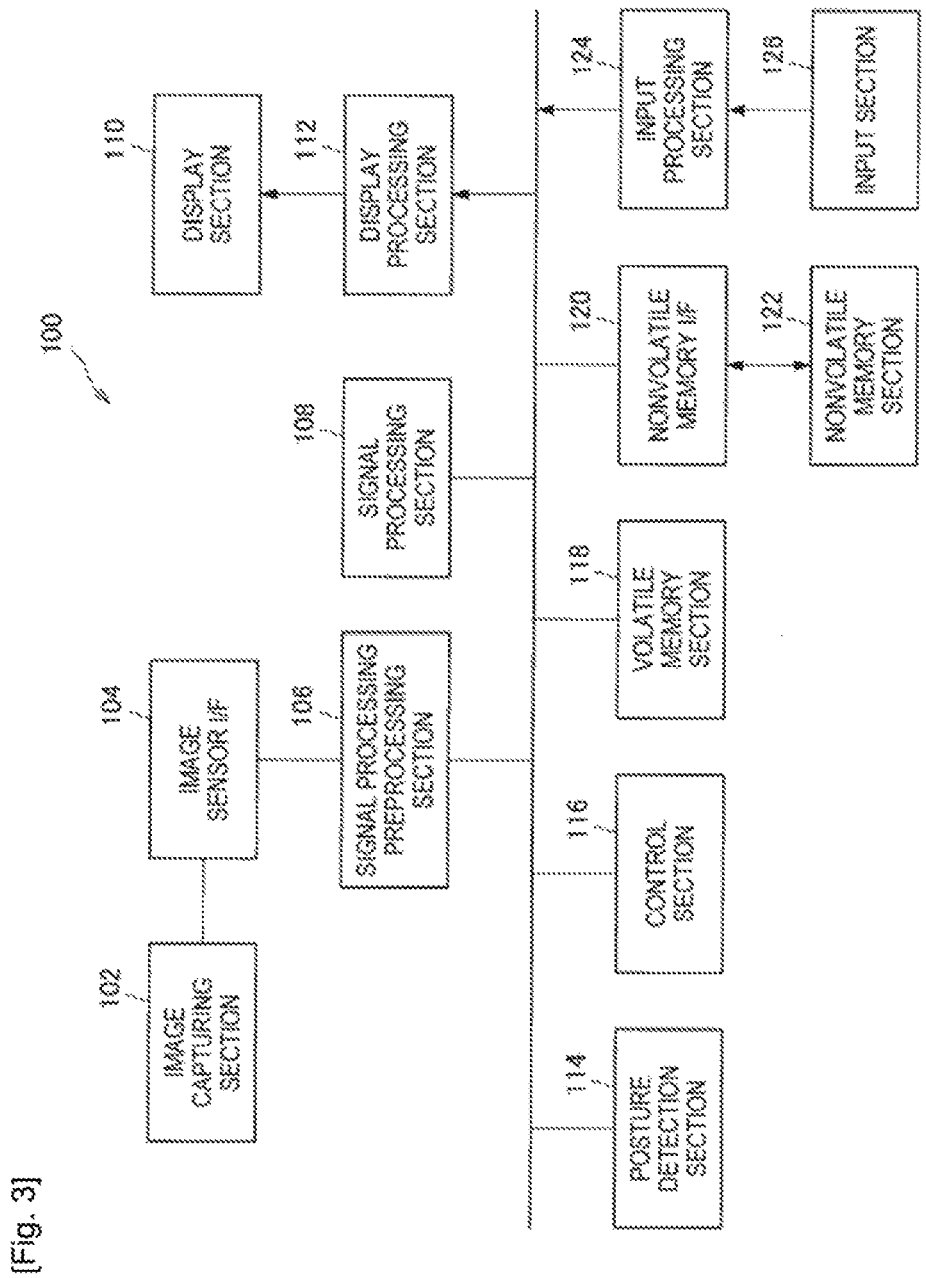

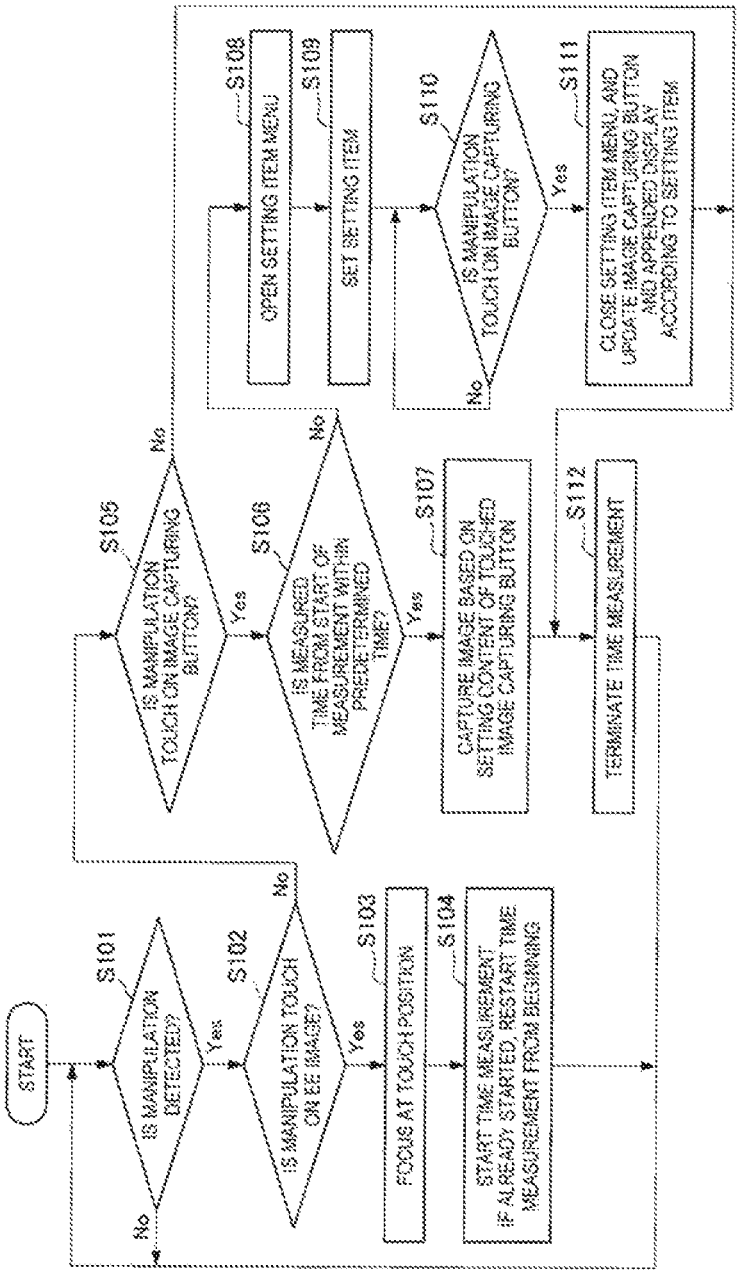
[Fig. 4]

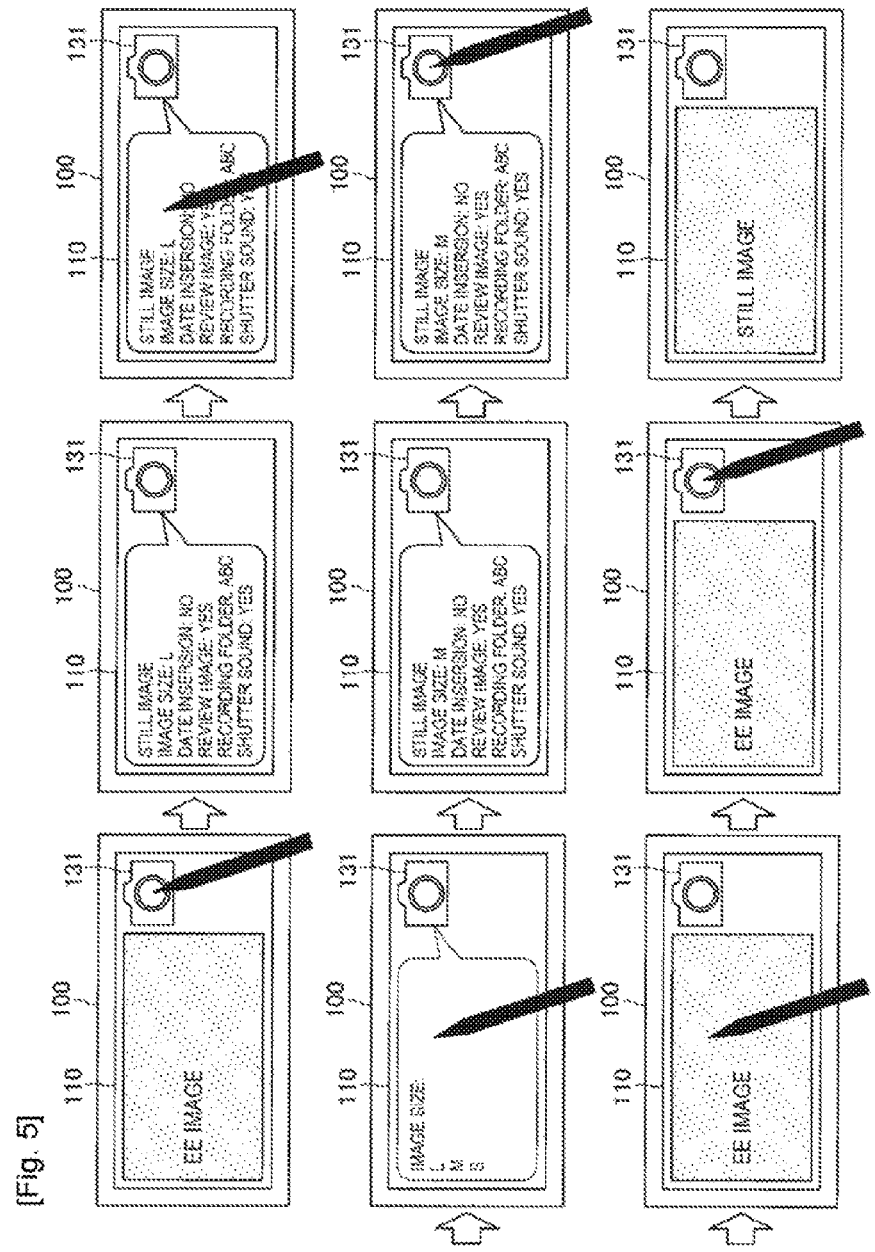

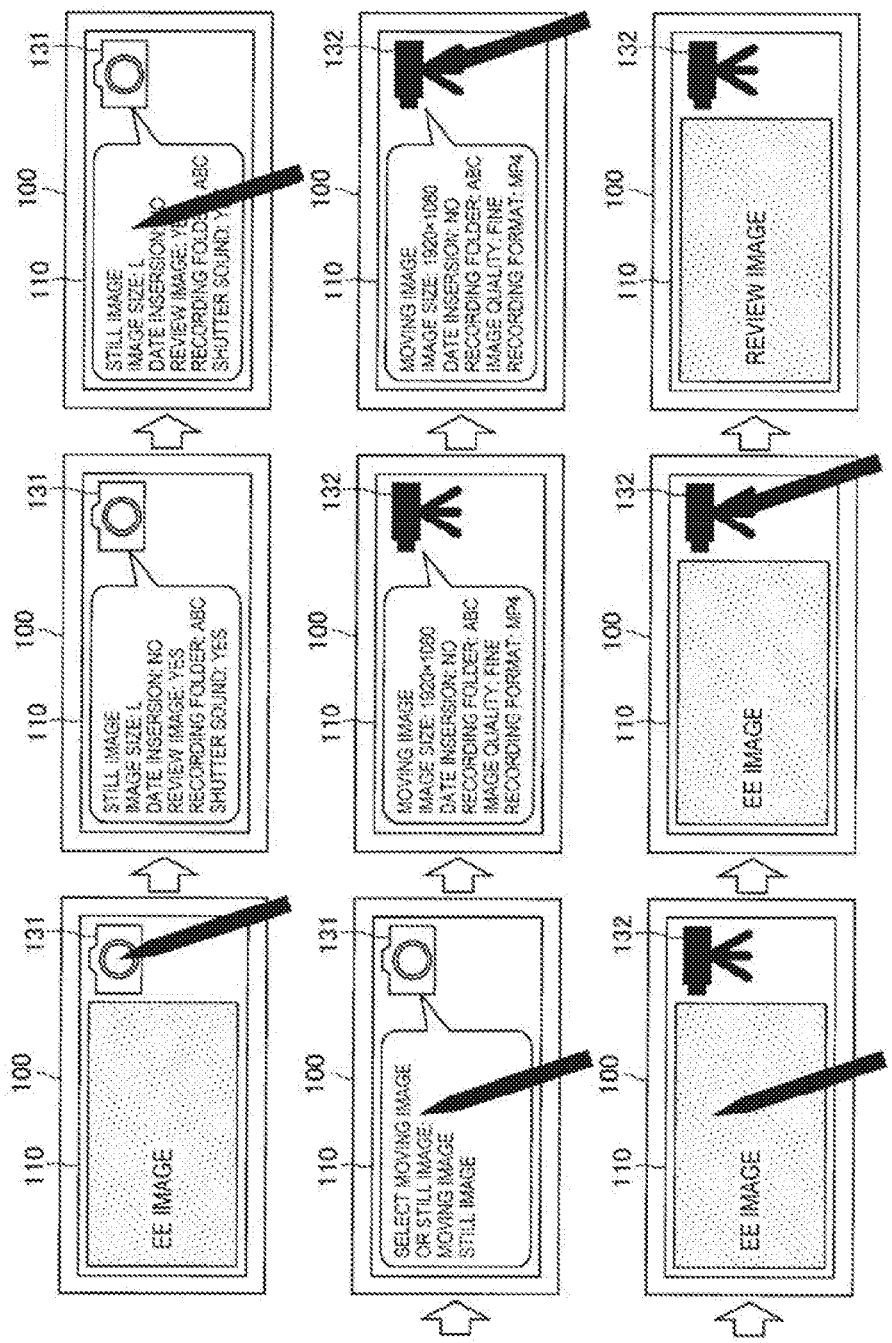
[Fig. 6]

[Fig. 7A]
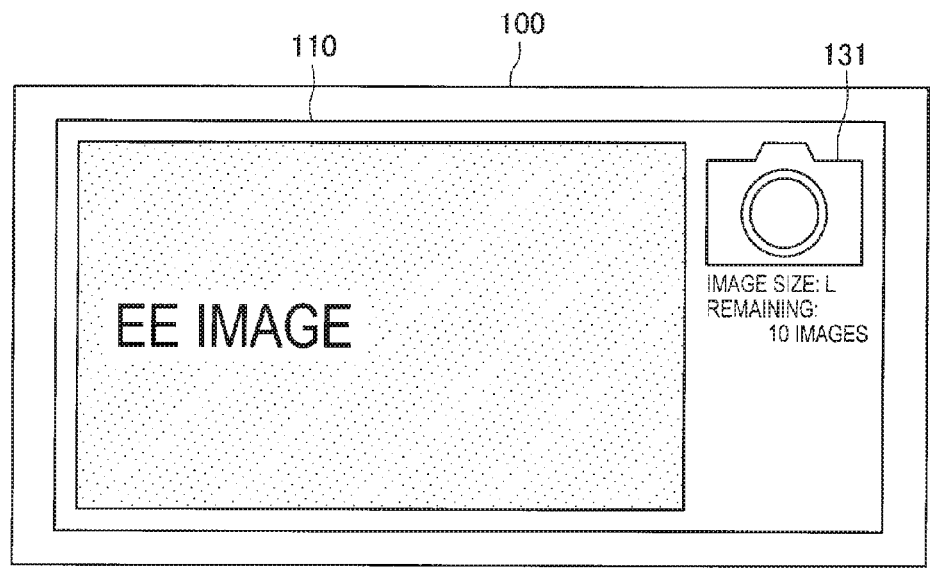
[Fig. 7B]
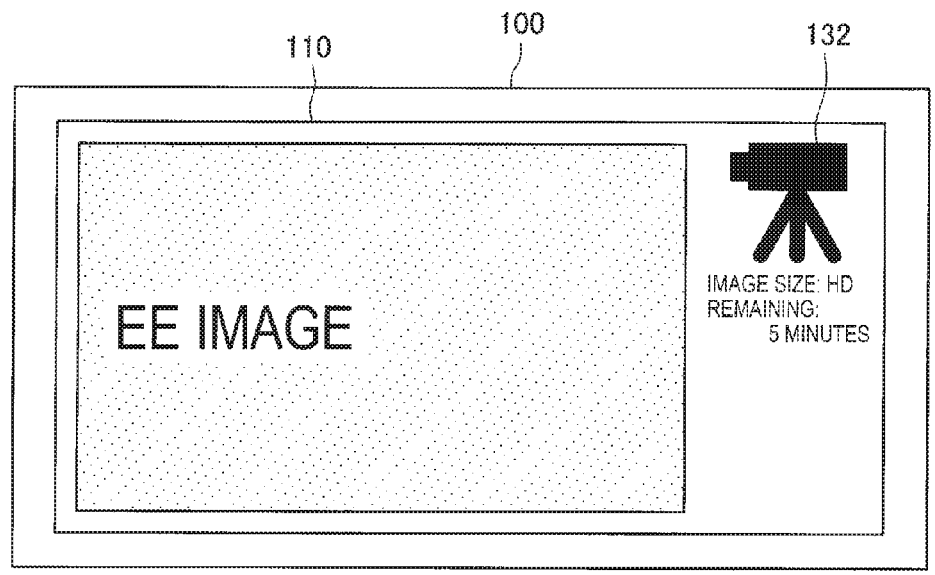

[Fig. 7C]
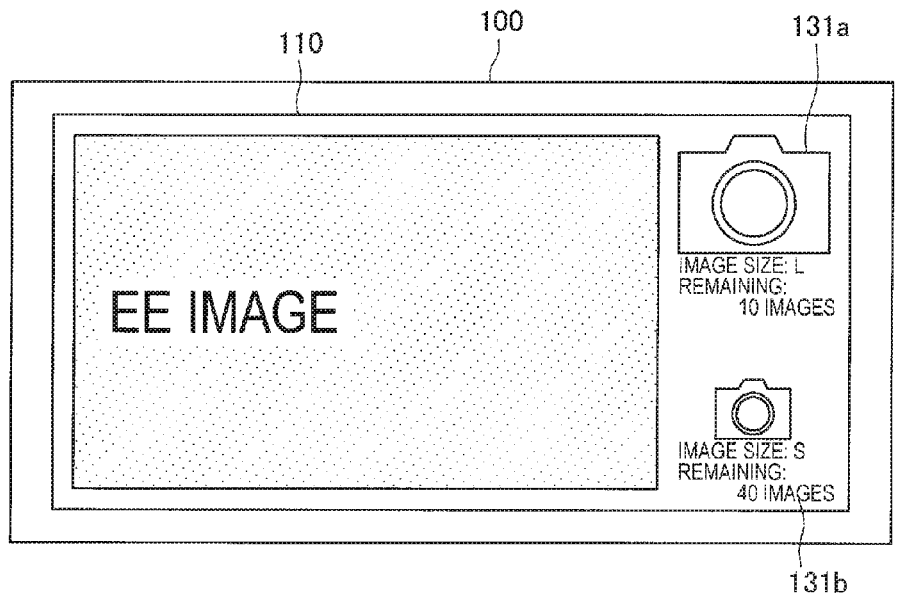
[Fig. 7D]
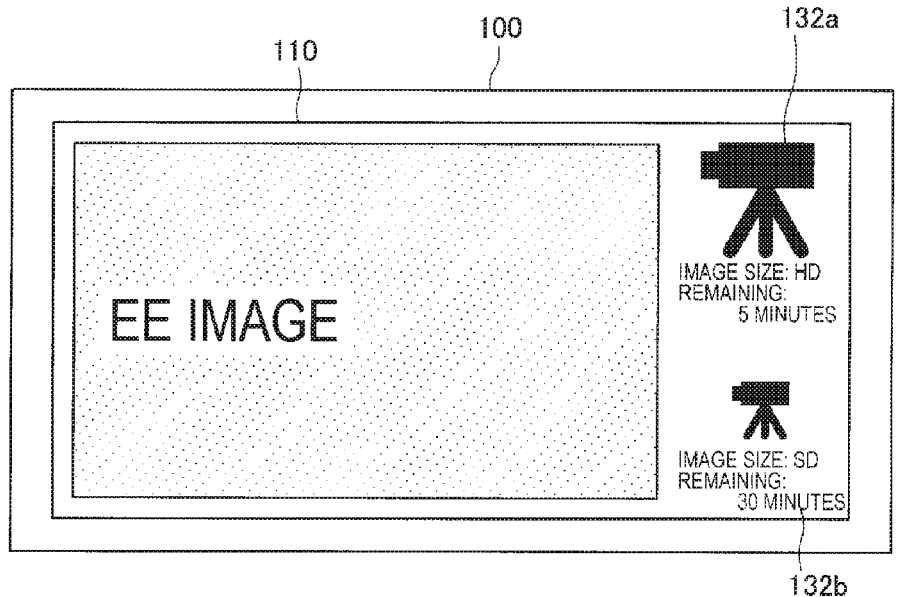

[Fig. 7E]
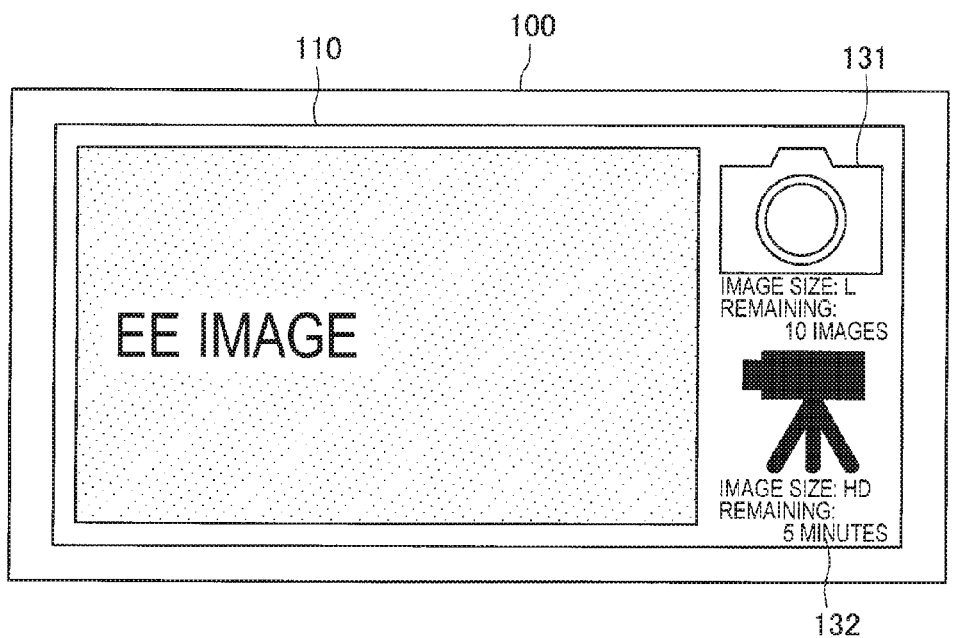

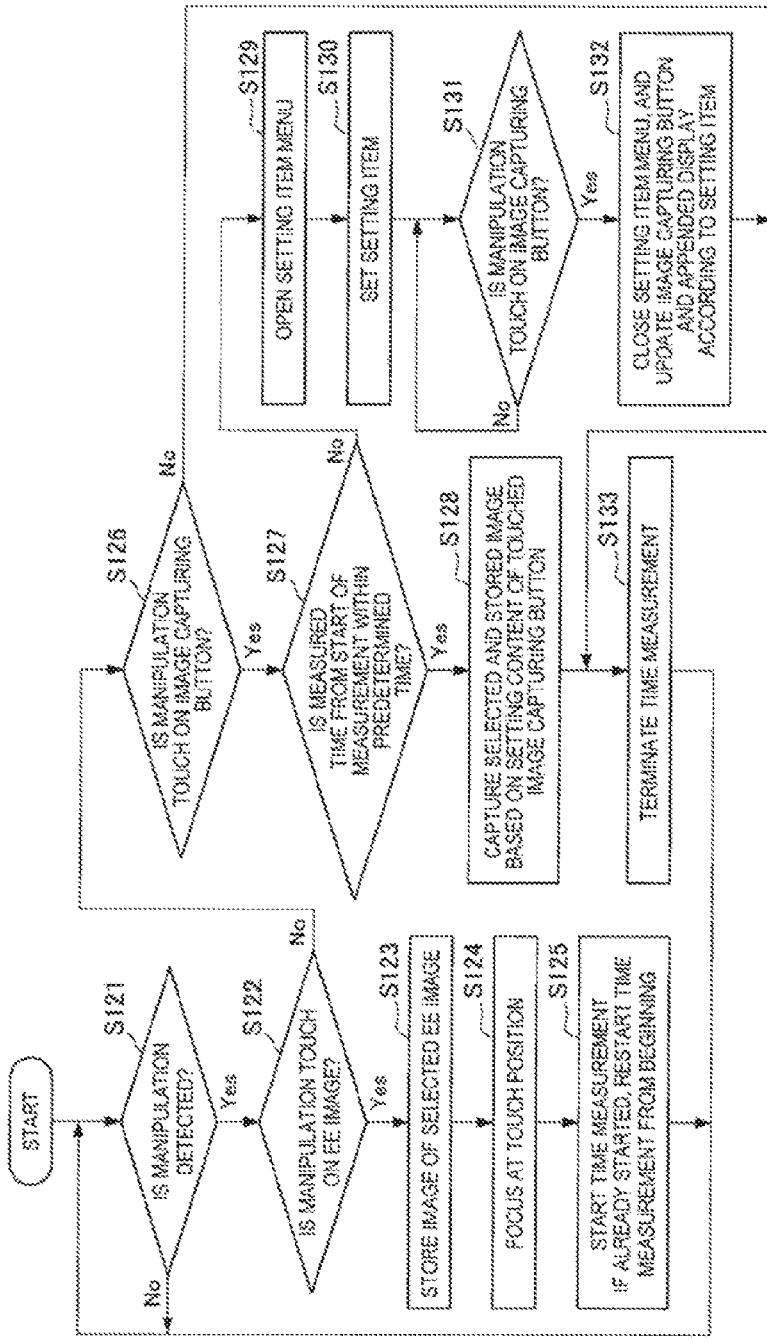
[Fig. 8]

[Fig. 9]
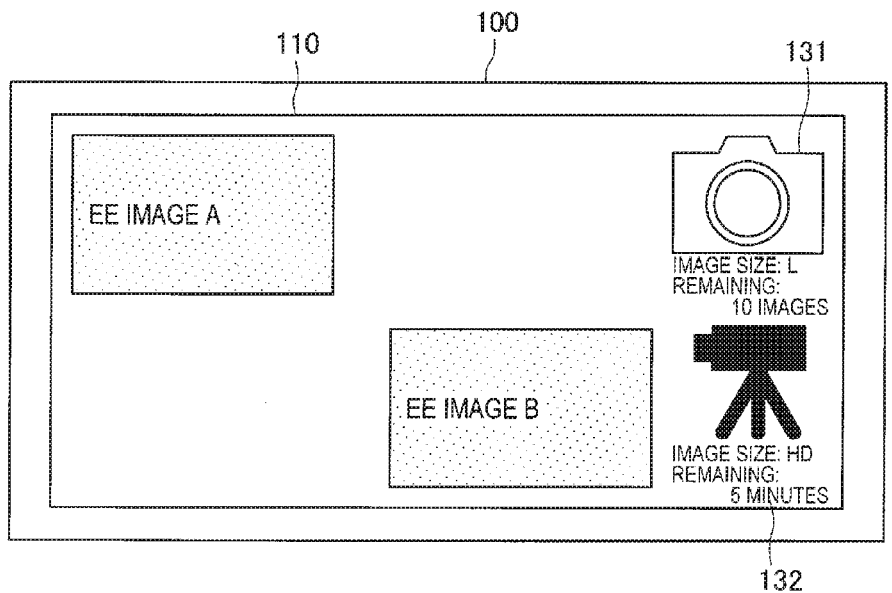

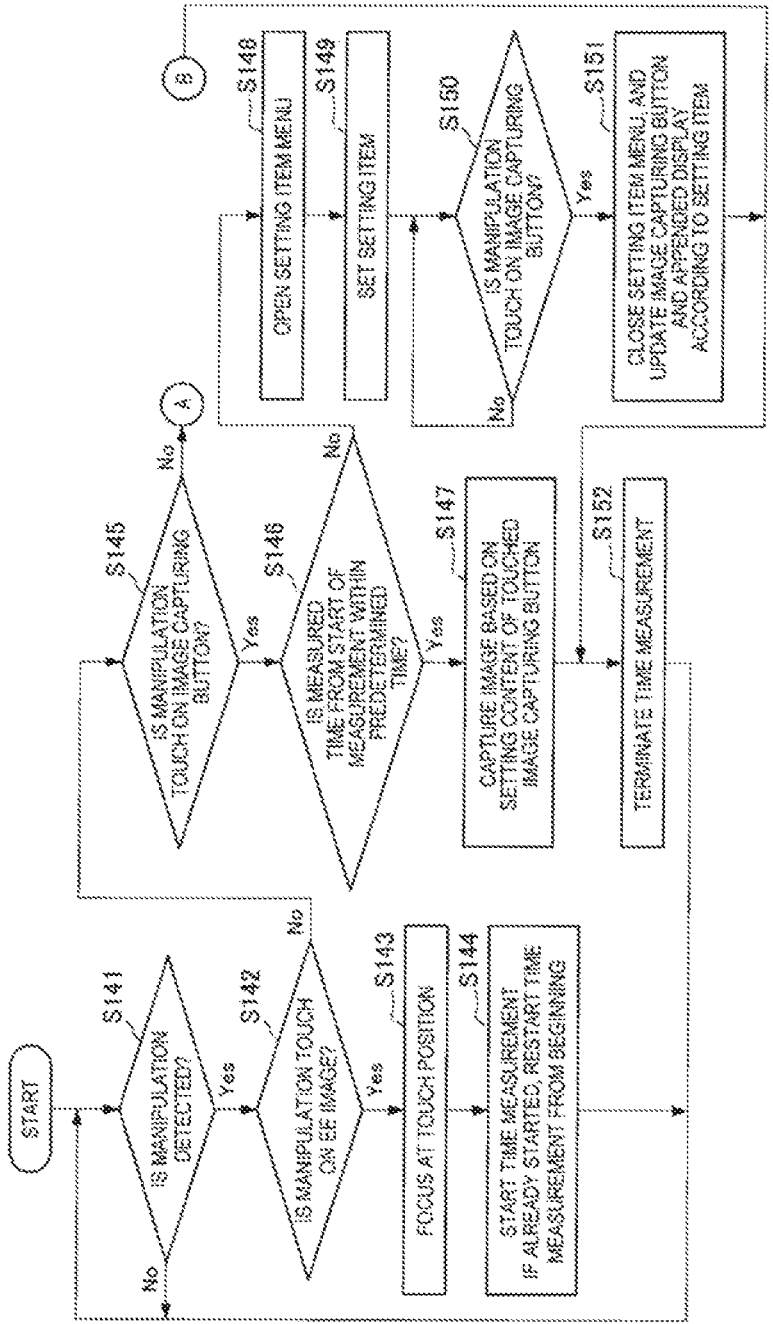
[Fig. 10]

[Fig. 11]
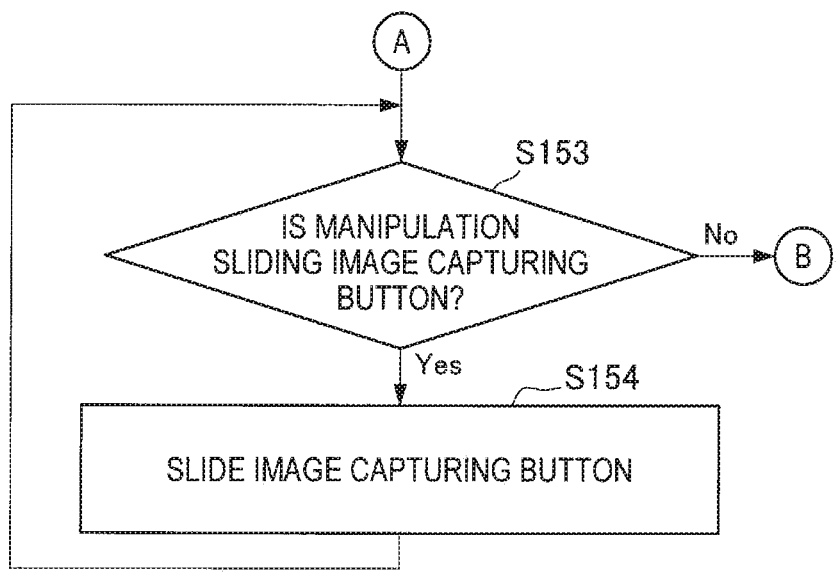

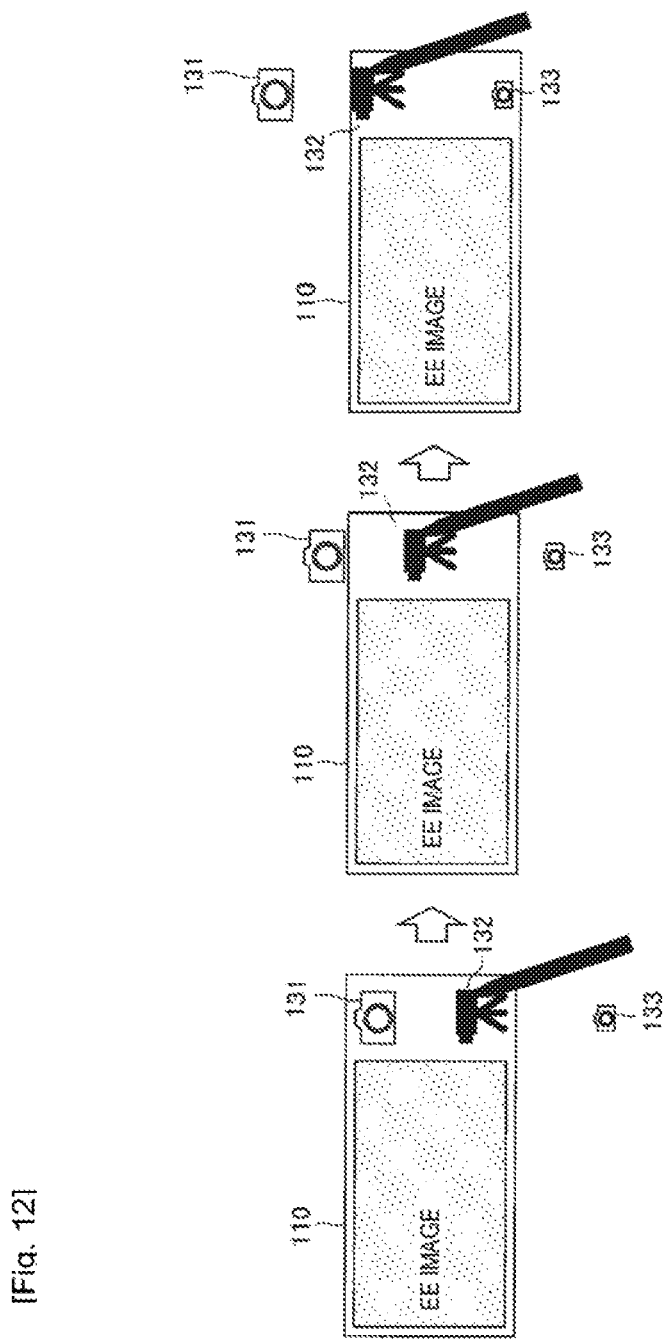

[Fig. 13]
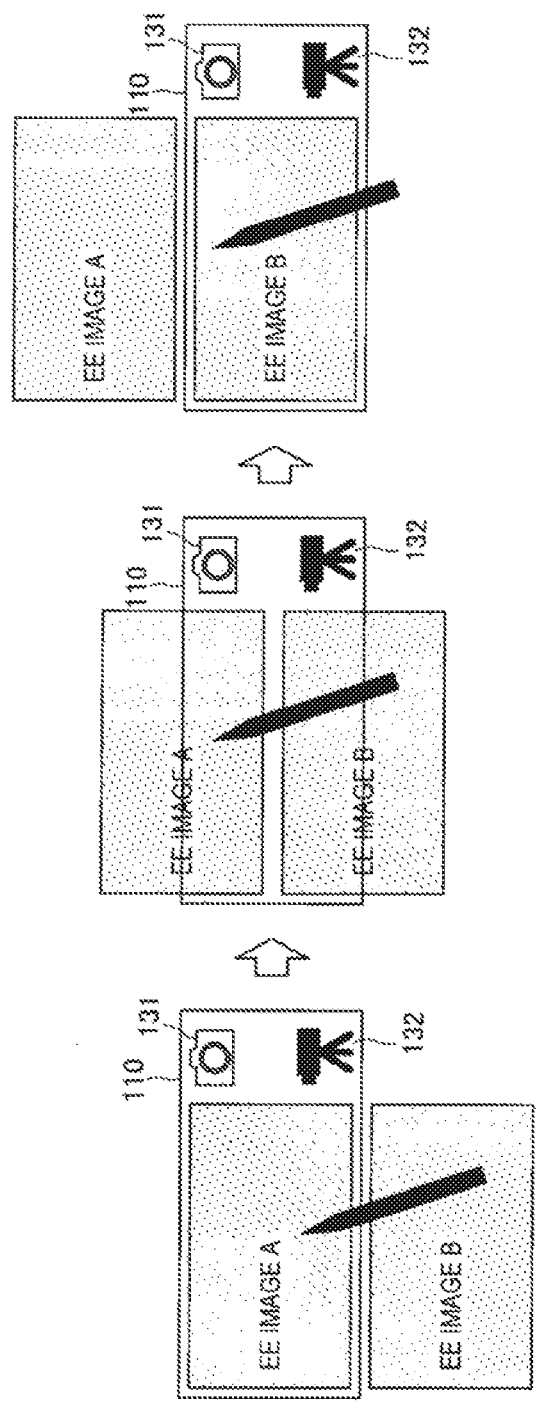

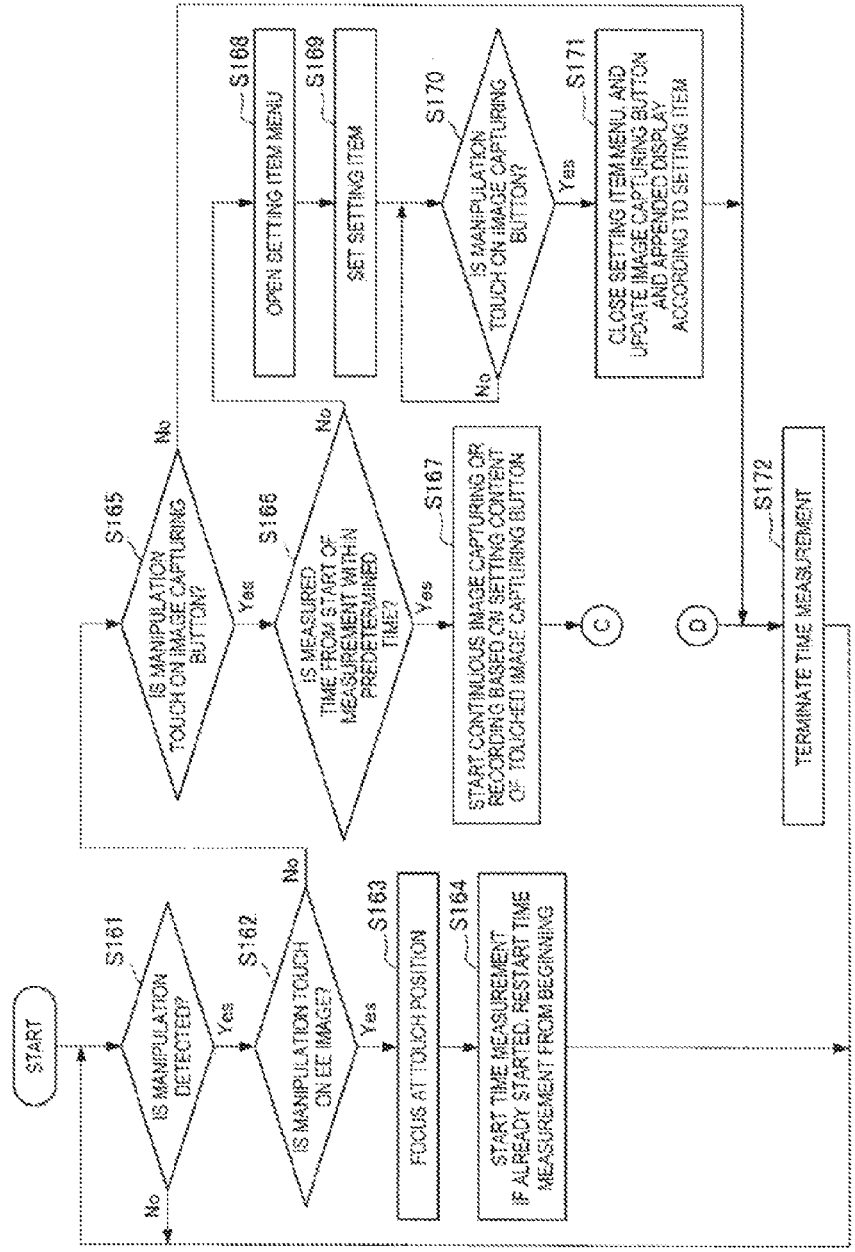
[Fig. 14]

[Fig. 15]
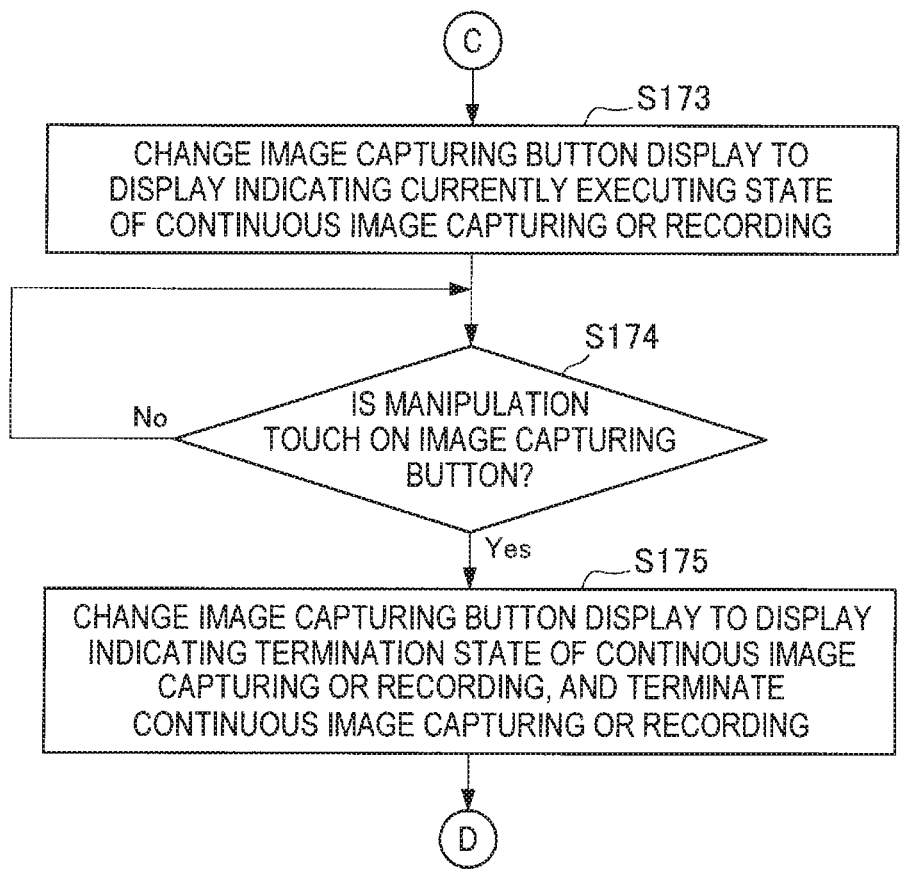

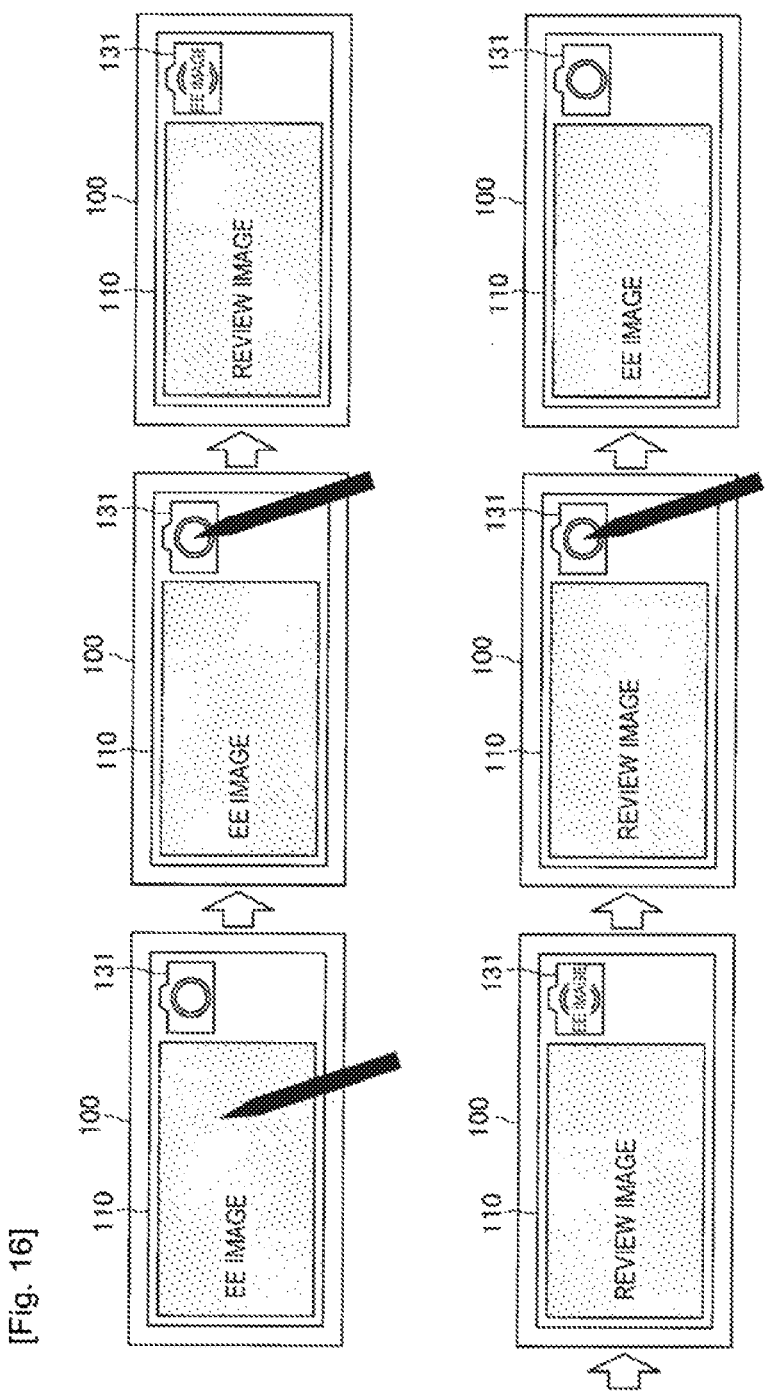
[Fig. 16]

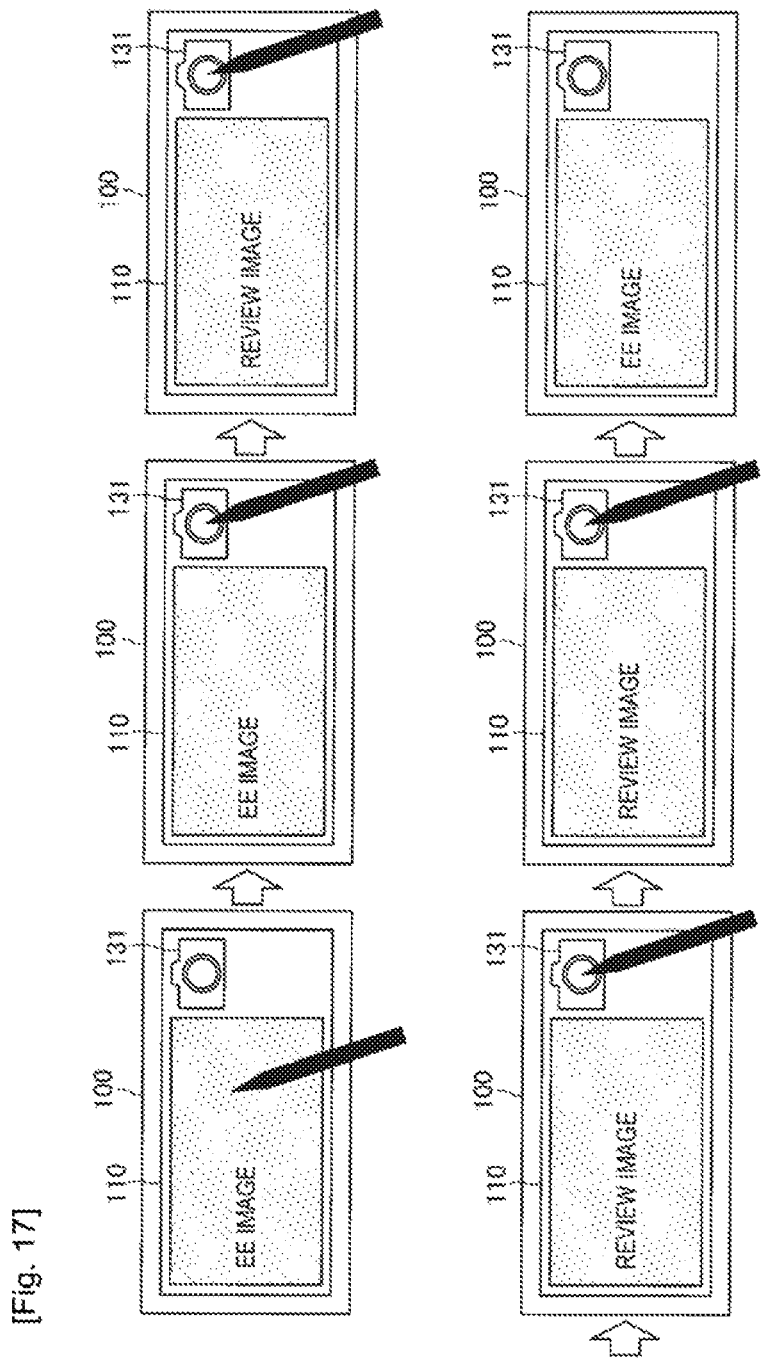
[Fig. 17]

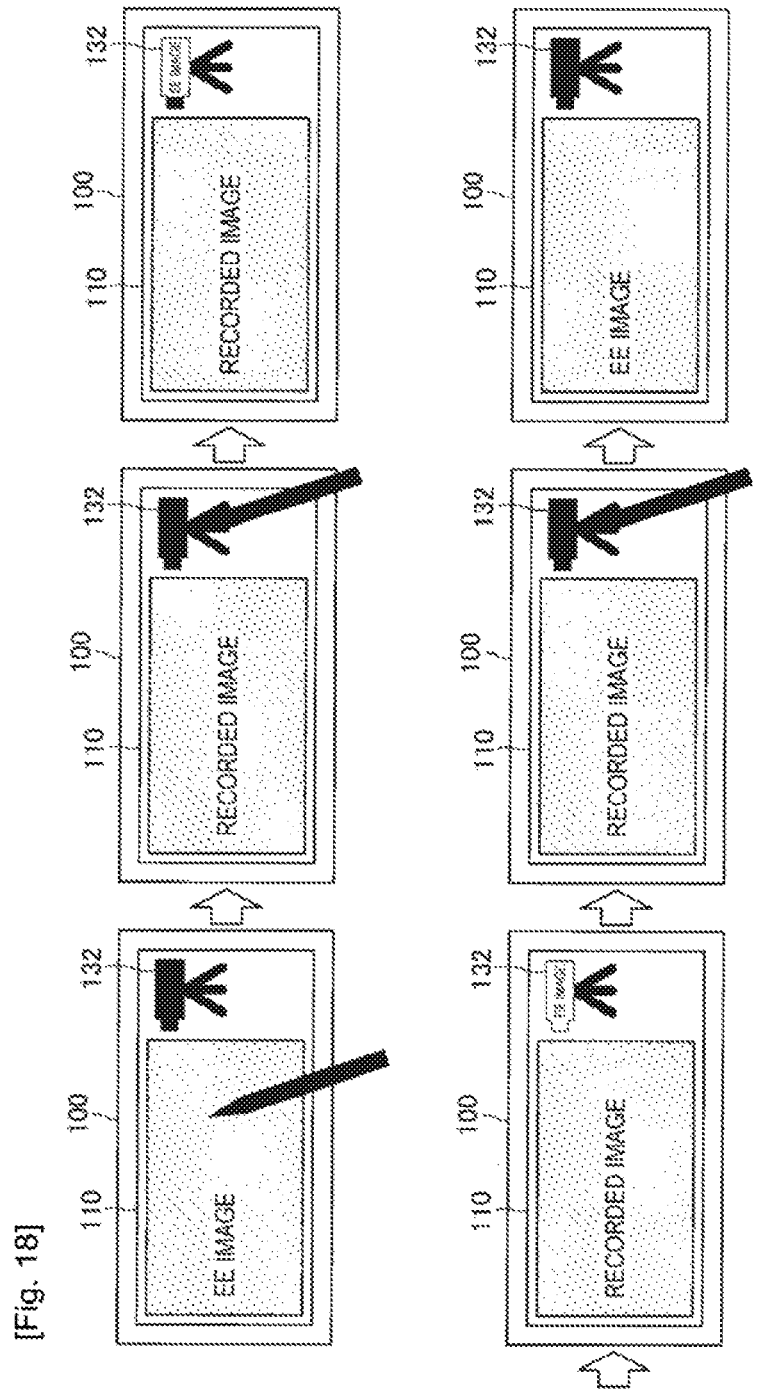
[Fig. 18]

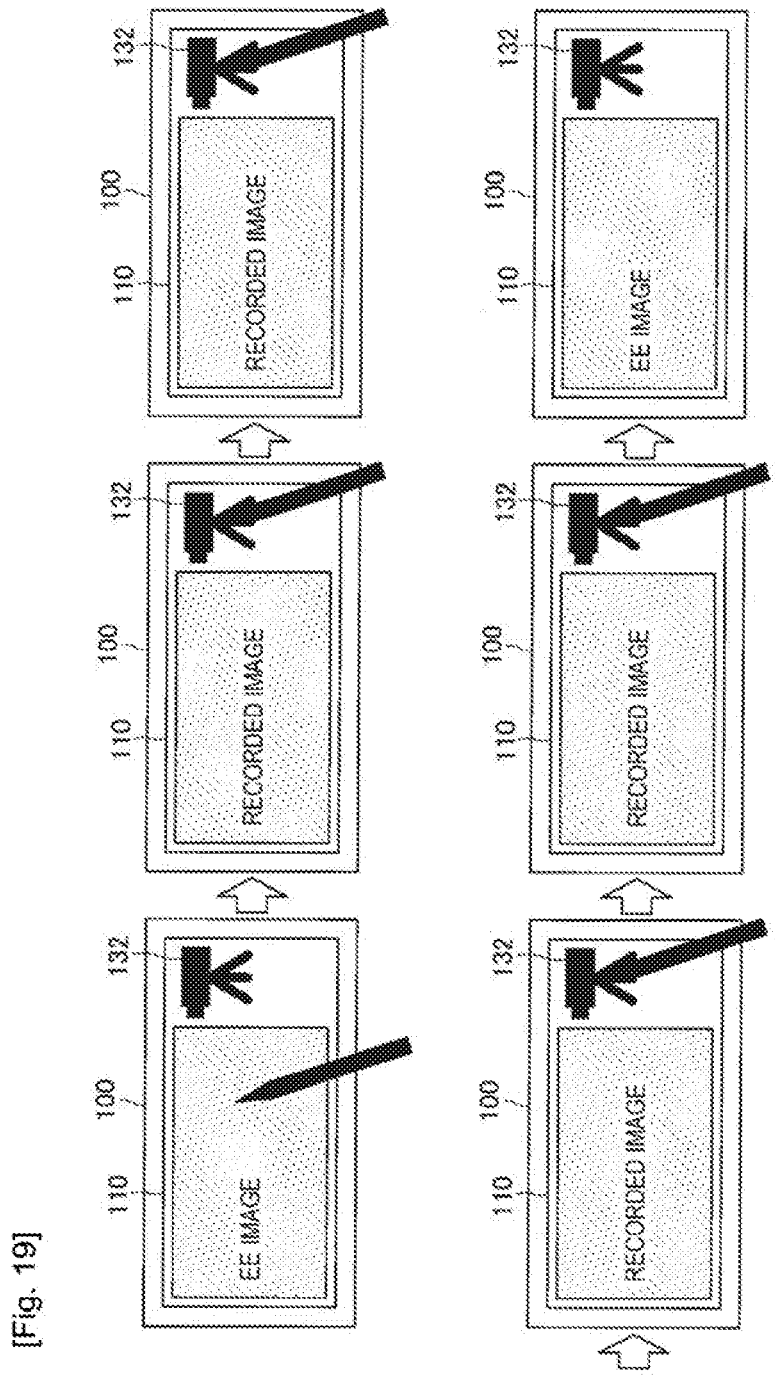
[Fig. 19]

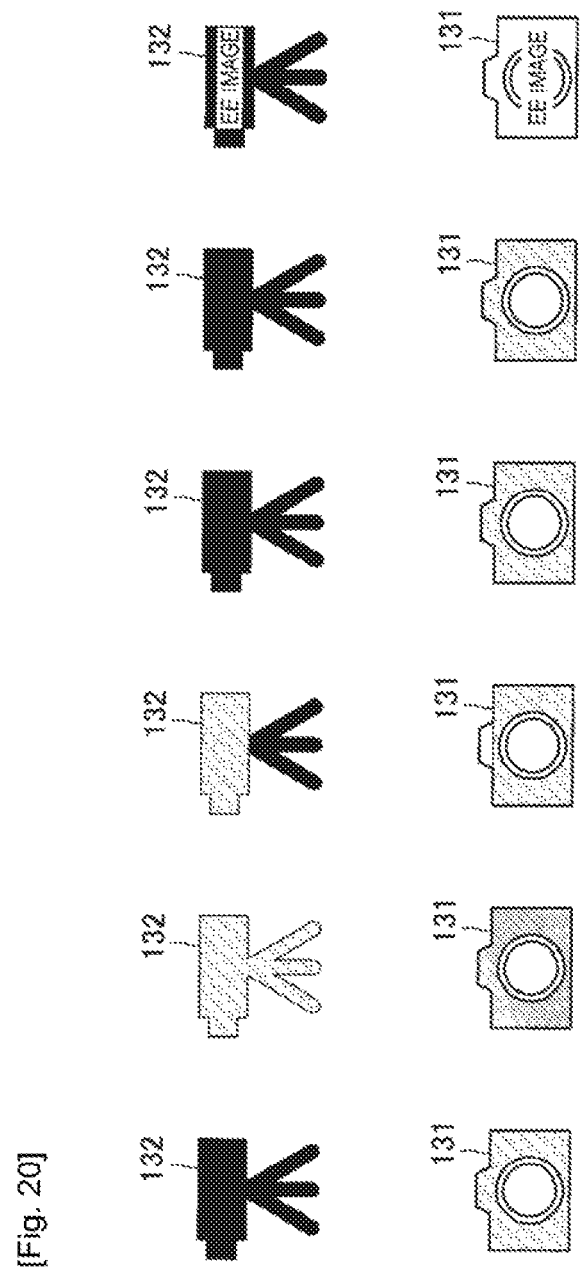
[Fig. 20]

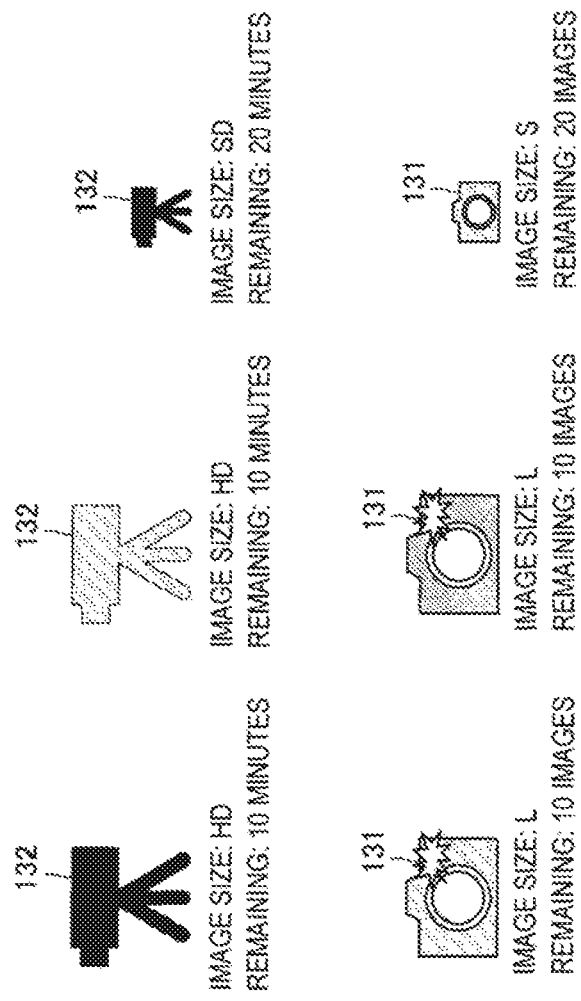
[Fig. 21]

[Fig. 22]

STILL IMAGE
IMAGE SIZE: L
DATE AND TIME INSERTION: NO
REVIEW IMAGE: YES
RED EYE REDUCTION: NO
RECORDING FOLDER: ABC
SHUTTER SOUND: YES
CONTINUOUS IMAGE CAPTURING: NO
IMAGE QUALITY: FINE
HIGH SENSITIVITY NR: YES
RECORDING FORMAT: JPEG
FLASH: AUTO
IMAGE CAPTURING MANIPURATION:
TOUCH IMAGE AND THEN TOUCH BUTTON
SETTING MANIPURATION: TOUCH BUTTON

STILL IMAGE
IMAGE SIZE: L
DATE AND TIME INSERTION: NO
REVIEW IMAGE: YES
RED EYE REDUCTION: NO
RECORDING FOLDER: ABC
SHUTTER SOUND: YES
CONTINUOUS IMAGE CAPTURING: NO
IMAGE QUALITY: FINE
HIGH SENSITIVITY NR: YES
RECORDING FORMAT: JPEG
FLASH: AUTO
WIND NOISE REDUCTION: ON
IMAGE CAPTURING MANIPURATION:
TOUCH IMAGE AND THEN TOUCH BUTTON
SETTING MANIPURATION: TOUCH BUTTON

MOVING IMAGE
IMAGE SIZE: 1920×1080
DATE AND TIME INSERTION: NO
RECORDING FOLDER: ABC
IMAGE QUALITY: FINE
HIGH SENSITIVITY NR: YES
RECORDING FORMAT: MP4
WIND NOISE REDUCTION: ON
IMAGE CAPTURING MANIPURATION:
TOUCH IMAGE AND THEN TOUCH BUTTON
SETTING MANIPURATION: TOUCH BUTTON

MOVING IMAGE
IMAGE SIZE: 1920×1080
DATE AND TIME INSERTION: NO
REVIEW IMAGE: NO
RED EYE REDUCTION: NO
RECORDING FOLDER: ABC
SHUTTER SOUND: NO
CONTINUOUS IMAGE CAPTURING: NO
IMAGE QUALITY: FINE
HIGH SENSITIVITY NR: YES
RECORDING FORMAT: MP4
FLASH: AUTO
WIND NOISE REDUCTION: ON
IMAGE CAPTURING MANIPURATION:
TOUCH IMAGE AND THEN TOUCH BUTTON
SETTING MANIPURATION: TOUCH BUTTON

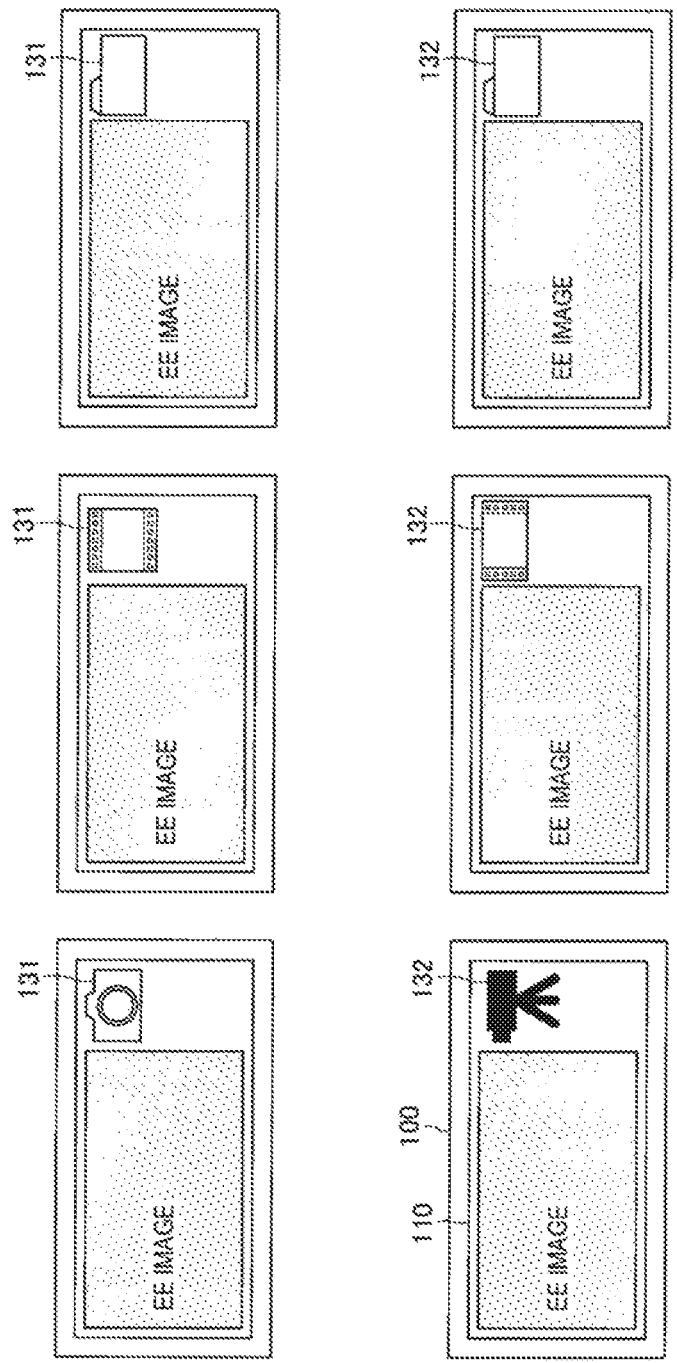

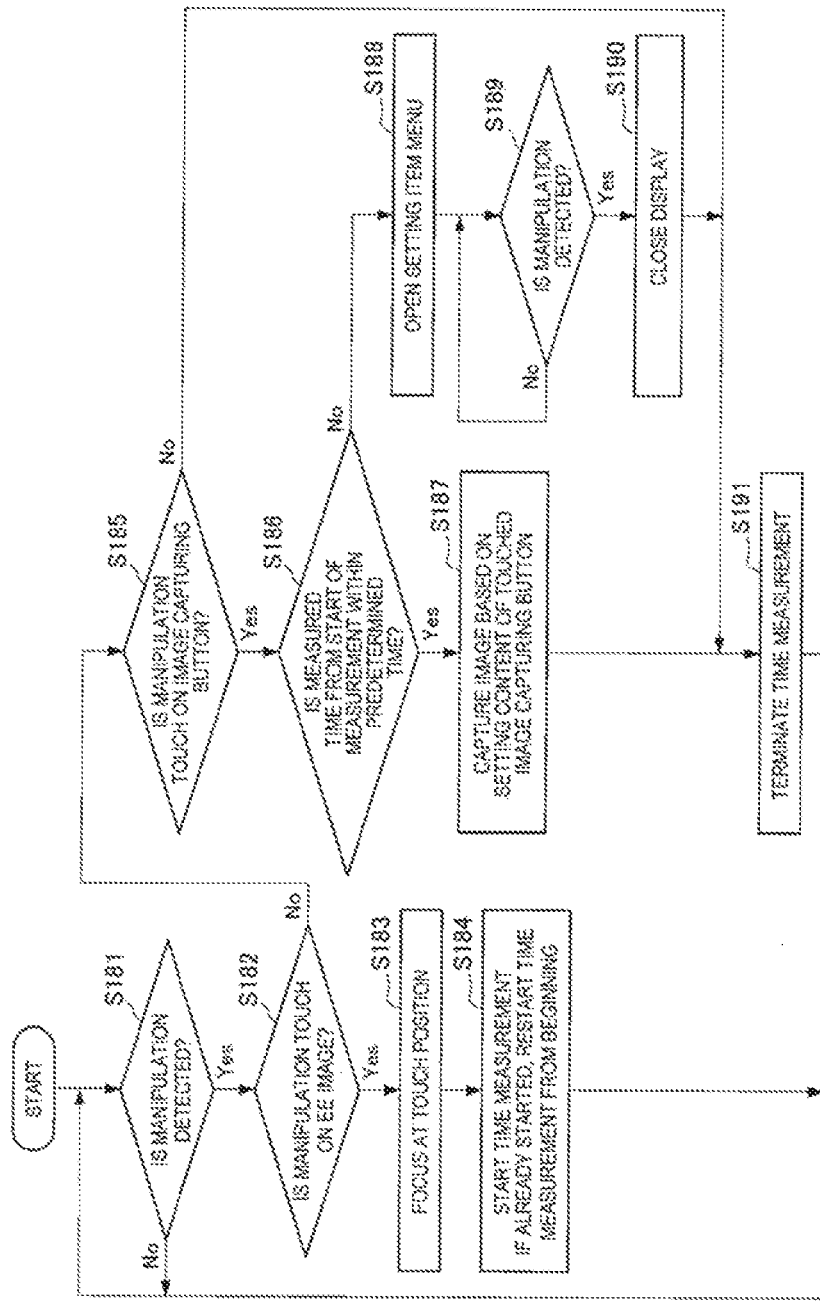
[Fig. 24]

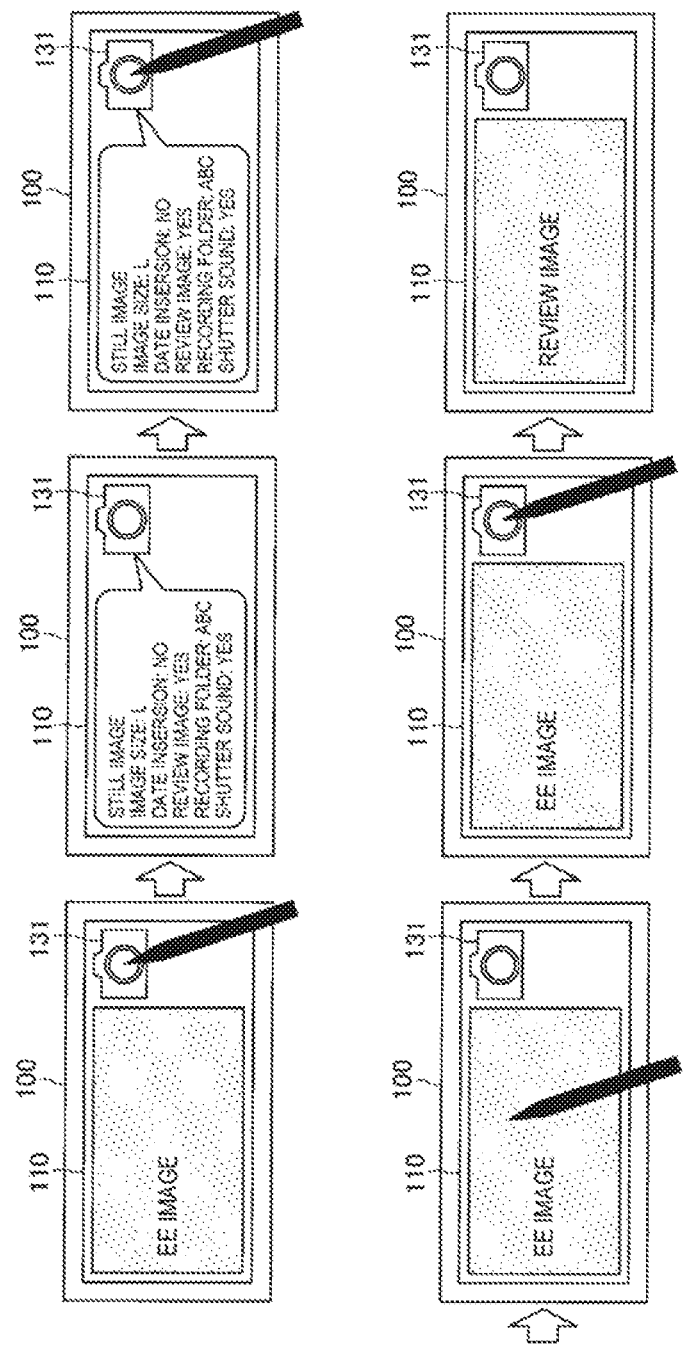

[Fig. 26A]
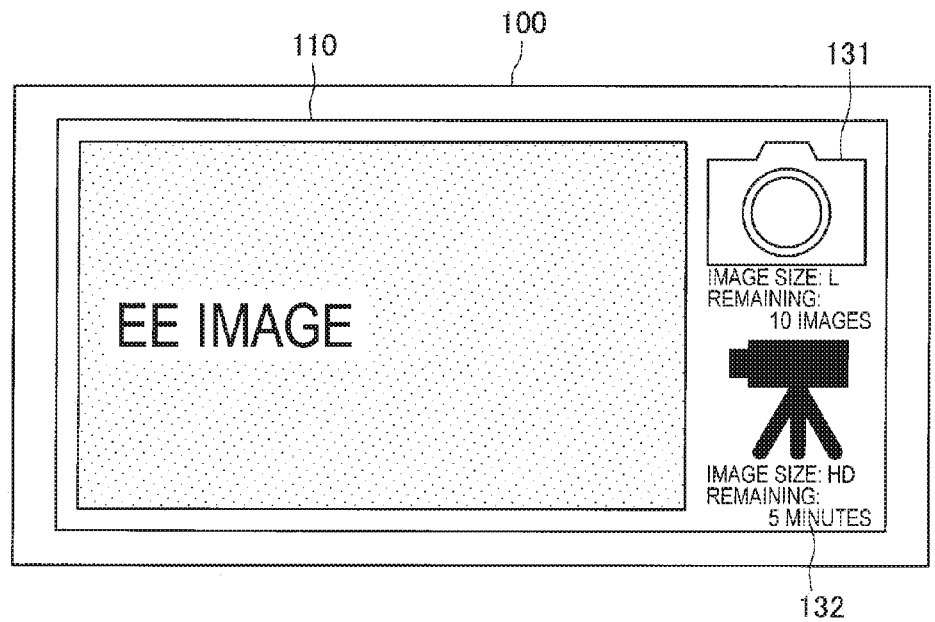
[Fig. 26B]
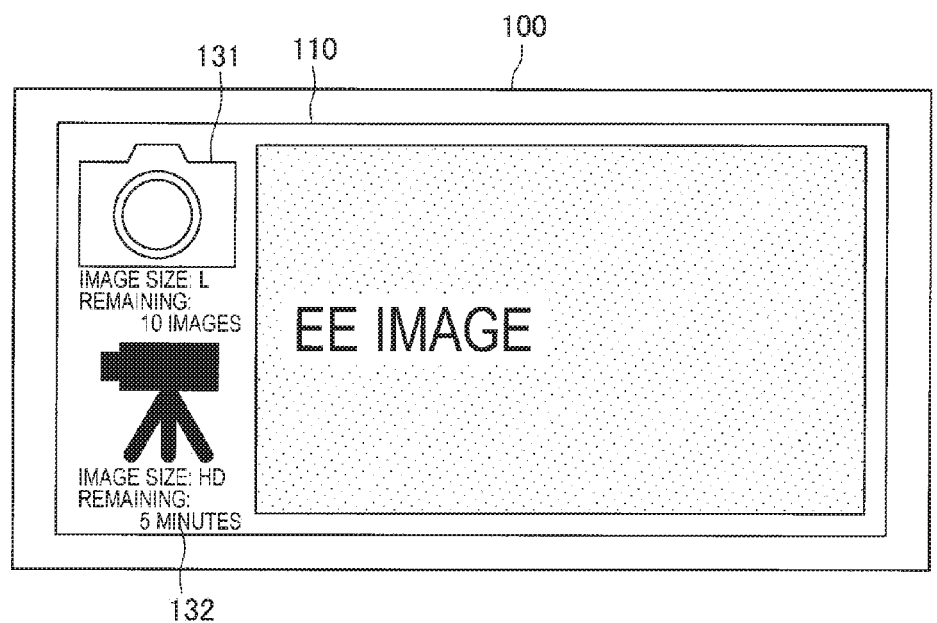

[Fig. 26C]
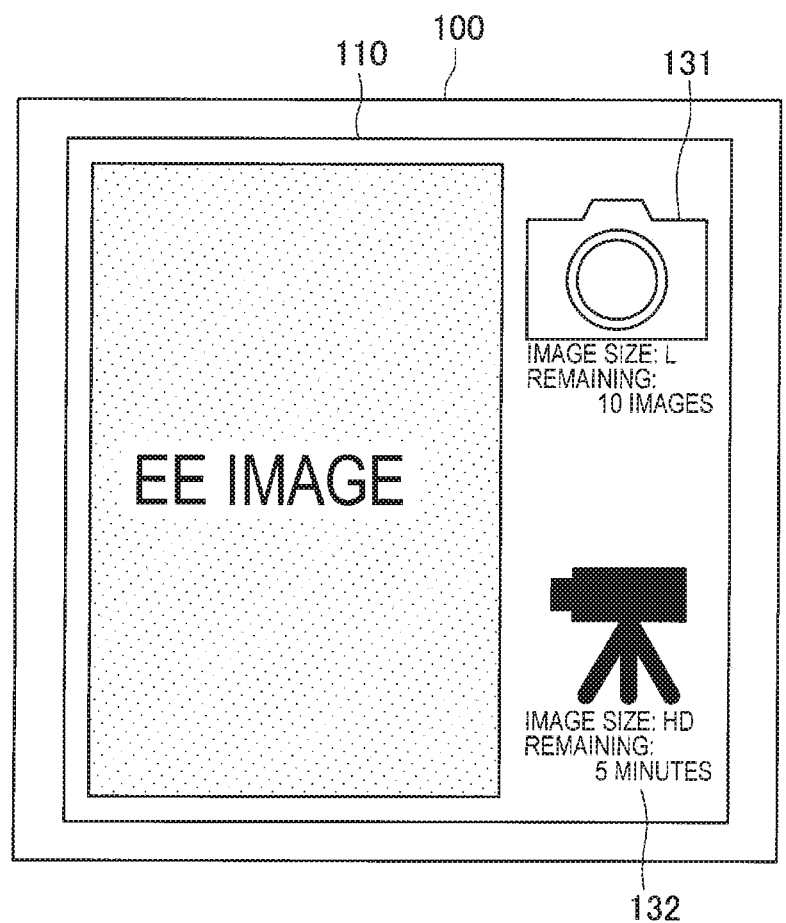

[Fig. 26D]
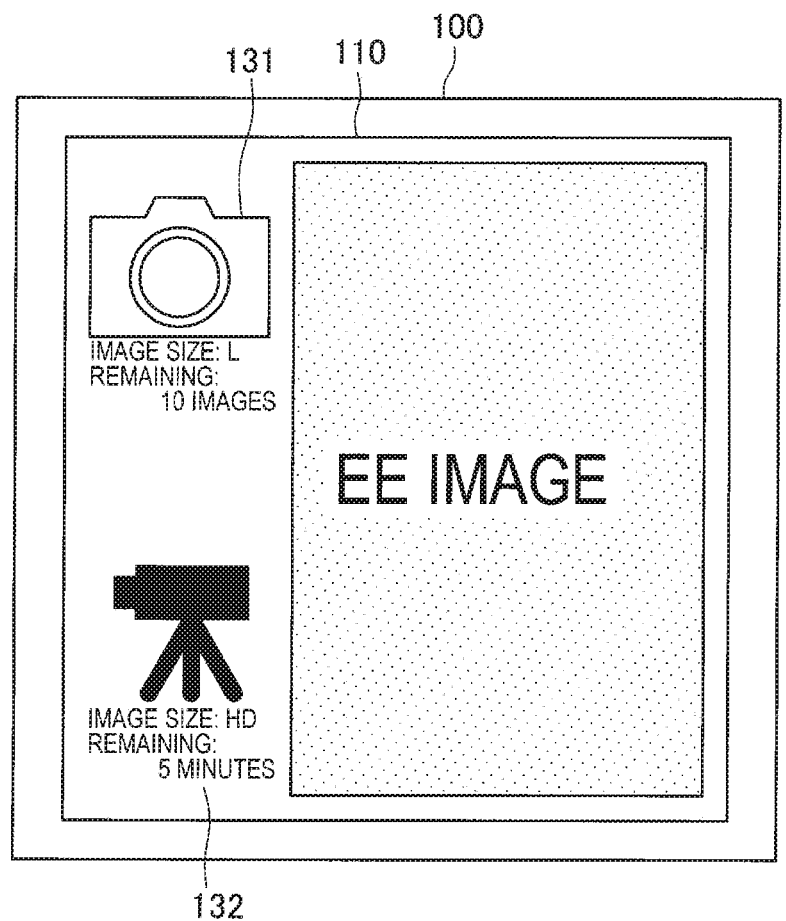

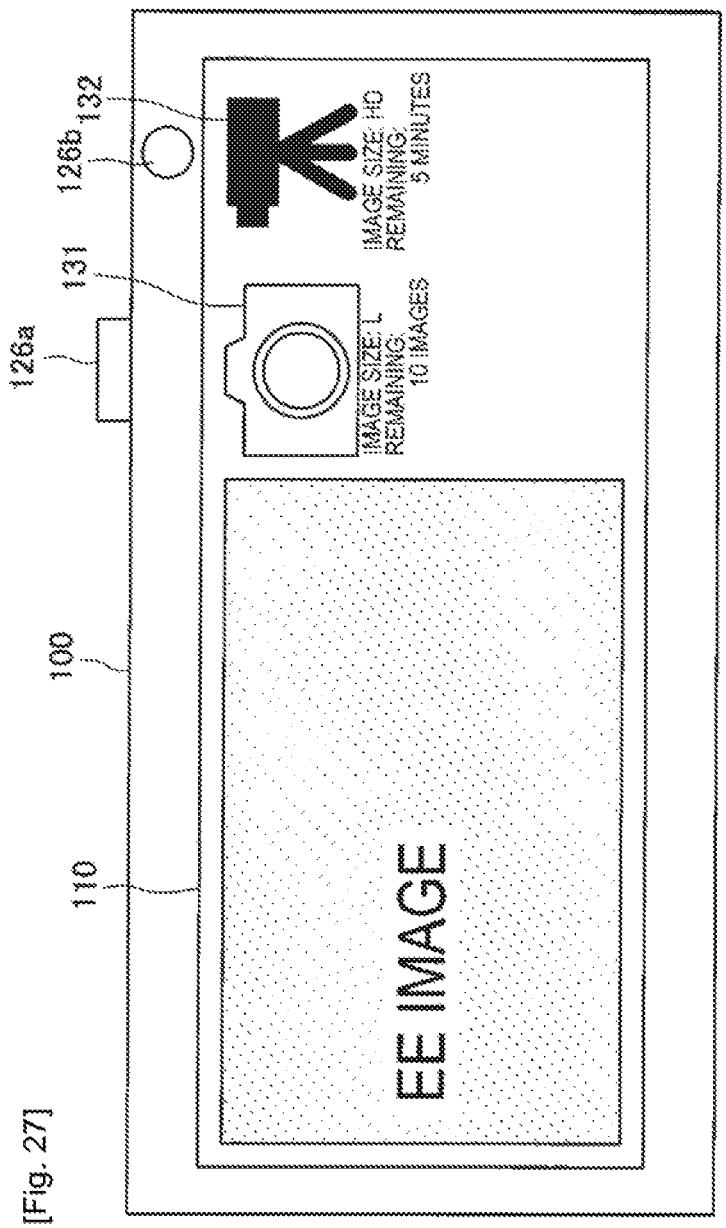

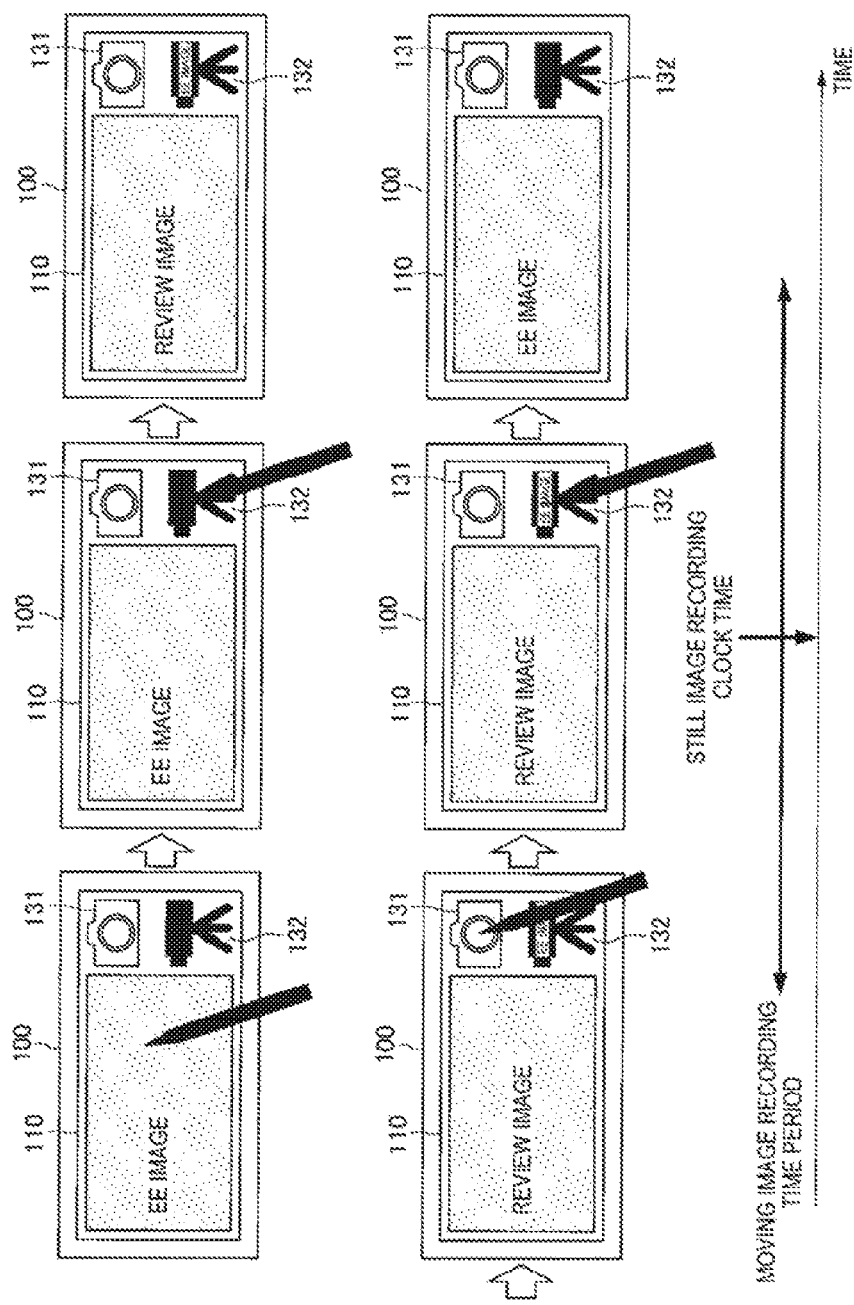
[Fig. 28]

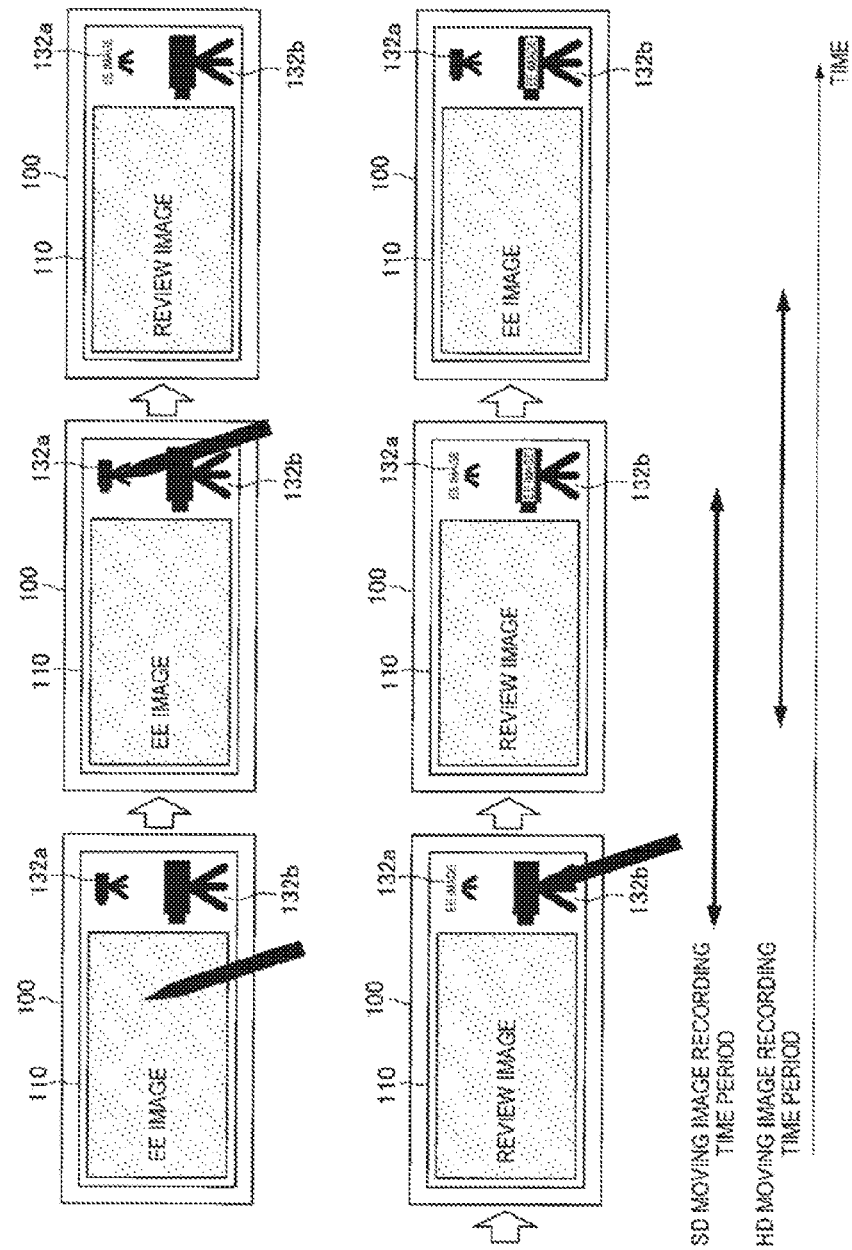

IMAGE CAPTURING CONTROL APPARATUS, IMAGE CAPTURING CONTROL METHOD TO CONTROL DISPLAY BASED ON USER INPUT

CROSS-REFERENCE TO RELATED APPLICATION

The present application is a continuation application of U.S. patent application Ser. No. 14/390,593, filed Oct. 3, 2014, which is a national stage of PCT/JP13/04642, filed Jul. 31, 2013, and claims the benefit of priority from prior Japanese Patent Application JP 2012-174794, filed Aug. 7, 2012, the entire content of which is incorporated herein by reference.

TECHNICAL FIELD

The present disclosure relates to an image capturing control apparatus, an image capturing control method, and a computer program.

BACKGROUND ART

In capturing images by using a digital camera, image capturing conditions such as a shutter speed, an aperture size, and an image size are typically set in advance. When a user presses down a shutter button, image capturing processing is executed under the image capturing conditions set in advance. Moreover, labor of setting the image capturing conditions is saved in the digital camera by registering a plurality of settings in advance with a plurality of dedicated buttons of the digital camera and then by reading the settings at the time of image capturing.

Meanwhile, PTL 1 discloses a technology of concurrently executing image capturing and determination of setting of an image capturing condition by associating functions related to the image capturing with a plurality of shutter manipulation stages.

CITATION LIST

Patent Literature

[PTL 1]
JP 2006-50419A

SUMMARY

Technical Problem

However, in the methods by which the image capturing conditions are set in advance and by which the image capturing conditions registered with the plurality of dedicated buttons are called, it is strenuous for the user to change any of the image capturing conditions and then to capture an image. The technology in PTL 1 described above makes it possible to concurrently perform setting of an image capturing condition and image capturing, but timing of selecting one of individual image capturing conditions does not necessarily coincide with timing of the image capturing. This might lead to missing of an opportunity of image capturing. Moreover, in the technology in PTL 1 described above, time for keeping a shutter button in a halfway-pressed state (a half-shutter-press state) or the like is long. For this reason, it is difficult to manipulate image capturing and is also necessary to set image capturing conditions in advance.

Hence, according to an embodiment of the present disclosure, there are provided an image capturing control apparatus, an image capturing control method, and a computer program, which are novel and improved, and which can cause the user to execute image capturing processing by causing the user to designate an image capturing condition with simple manipulation without forcing the user special manipulation.

Solution to Problem

According to an embodiment of the present disclosure, there is provided an image capturing control apparatus that detects that a first user input is received at a user interface corresponding to a display configured to display an image captured by an image capturing unit; determines a status of a timer corresponding to the user interface upon detecting the first user input; controls an image capture operation of the image capturing unit upon detecting the first input and determining that the status of the timer satisfies a first predetermined condition; and controls the display to display an image condition settings menu upon detecting the first input and determining that the status of the timer satisfies a second predetermined condition.

The user interface may be a touch panel disposed on, or integrally formed with, the display. The apparatus may be configured to detect that a second user input is received at the touch panel selecting the displayed image. The apparatus may also be configured to control a focusing operation corresponding to the image captured by the image capture unit at a position corresponding to the second user input, and start the timer upon detecting that the second user input is received at the touch panel.

The apparatus may be configured to control the display to display the image condition settings menu upon detecting the first input and determining that the timer has not yet started or exceeds a predetermined time.

The apparatus may detect that a second user input is received at a user interface corresponding to the display when the image condition settings menu is displayed; and control the display to stop displaying the image condition settings menu upon detecting the second user input.

The apparatus may control the display to display an icon corresponding to the image capture operation; and detect, as the first user input, a selection of the icon corresponding to the image capture operation.

According to an embodiment of the present disclosure, there is provided a method including detecting that a first user input is received at a user interface corresponding to a display configured to display an image captured by an image capturing unit; determining a status of a timer corresponding to the user interface upon detecting the first user input; and controlling an image capture operation the image capturing unit upon detecting the first input and determining that the status of the timer satisfies a first predetermined condition; and controlling the display to display an image condition settings menu upon detecting the first input and determining that the status of the timer satisfies a second predetermined condition.

According to an embodiment of the present disclosure, there is provided a non-transitory computer-readable medium including computer-program instruction, which when executed by an information processing system, cause the information processing system to: detect that a first user input is received at a user interface corresponding to a display configured to display an image captured by an image capturing unit; determine a status of a timer corresponding to the user interface upon detecting the first user input; control an image capture operation of the image capturing unit upon detecting the first input and determining that the status of the timer satisfies a first predetermined condition; and control the display to display an image condition settings menu upon detecting the first input and determining that the status of the timer satisfies a second predetermined condition.

Advantageous Effects of Invention

As described above according to the embodiment of the present disclosure, there can be provided an image capturing control apparatus, an image capturing control method, and a computer program, which are novel and improved, and which can cause the user to execute image capturing processing by causing the user to designate an image capturing condition with simple manipulation without forcing the user special manipulation.

BRIEF DESCRIPTION OF DRAWINGS

FIG. 1 is an explanatory diagram illustrating related art.
FIG. 2A is an explanatory diagram illustrating an appearance example of an image capturing apparatus 100 according to one embodiment of the present disclosure.
FIG. 2B is an explanatory diagram illustrating a modification of the image capturing apparatus 100 according to the embodiment of the present disclosure.
FIG. 2C is an explanatory diagram illustrating a modification of the image capturing apparatus 100 according to the embodiment of the present disclosure.
FIG. 3 is an explanatory diagram illustrating a functional configuration example of the image capturing apparatus 100 according to the embodiment of the present disclosure.
FIG. 4 is a flowchart illustrating an operation example of the image capturing apparatus 100 according to the embodiment of the present disclosure.
FIG. 5 is an explanatory diagram illustrating an example of screens displayed in a display section 110 of the image capturing apparatus 100 according to the embodiment of the present disclosure.
FIG. 6 is an explanatory diagram illustrating an example of screens displayed in the display section 110 of the image capturing apparatus 100 according to the embodiment of the present disclosure.
FIG. 7A is an explanatory diagram illustrating an example of a screen displayed in the display section 110 of the image capturing apparatus 100 according to the embodiment of the present disclosure.
FIG. 7B is an explanatory diagram illustrating an example of a screen displayed in the display section 110 of the image capturing apparatus 100 according to the embodiment of the present disclosure.
FIG. 7C is an explanatory diagram illustrating an example of a screen displayed in the display section 110 of the image capturing apparatus 100 according to the embodiment of the present disclosure.
FIG. 7D is an explanatory diagram illustrating an example of a screen displayed in the display section 110 of the image capturing apparatus 100 according to the embodiment of the present disclosure.
FIG. 7E is an explanatory diagram illustrating an example of a screen displayed in the display section 110 of the image capturing apparatus 100 according to the embodiment of the present disclosure.
FIG. 8 is a flowchart illustrating an operation example of the image capturing apparatus 100 according to the embodiment of the present disclosure.
FIG. 9 is an explanatory diagram illustrating an example of a screen displayed in the display section 110 of the image capturing apparatus 100 according to the embodiment of the present disclosure.
FIG. 10 is a flowchart illustrating an operation example of the image capturing apparatus 100 according to the embodiment of the present disclosure.
FIG. 11 is a flowchart illustrating the operation example of the image capturing apparatus 100 according to the embodiment of the present disclosure.
FIG. 12 is an explanatory diagram illustrating an example of screens displayed in the display section 110 of the image capturing apparatus 100 according to the embodiment of the present disclosure.
FIG. 13 is an explanatory diagram illustrating an example of screens displayed in the display section 110 of the image capturing apparatus 100 according to the embodiment of the present disclosure.
FIG. 14 is a flowchart illustrating an operation example of the image capturing apparatus 100 according to the embodiment of the present disclosure.
FIG. 15 is a flowchart illustrating the operation example of the image capturing apparatus 100 according to the embodiment of the present disclosure.
FIG. 16 is an explanatory diagram illustrating an example of screens displayed in the display section 110 of the image capturing apparatus 100 according to the embodiment of the present disclosure.
FIG. 17 is an explanatory diagram illustrating an example of screens displayed in the display section 110 of the image capturing apparatus 100 according to the embodiment of the present disclosure.
FIG. 18 is an explanatory diagram illustrating an example of screens displayed in the display section 110 of the image capturing apparatus 100 according to the embodiment of the present disclosure.
FIG. 19 is an explanatory diagram illustrating an example of screens displayed in the display section 110 of the image capturing apparatus 100 according to the embodiment of the present disclosure.
FIG. 20 is an explanatory diagram illustrating display examples of image capturing buttons 131 and 132.
FIG. 21 is an explanatory diagram illustrating display examples of the image capturing buttons 131 and 132.
FIG. 22 illustrates setting item examples of photographing conditions displayed in the display section 110 by the image capturing apparatus 100 according to the embodiment of the present disclosure.
FIG. 23 is an explanatory diagram illustrating display examples of the image capturing buttons 131 and 132.
FIG. 24 is a flowchart illustrating an operation example of the image capturing apparatus 100 according to the embodiment of the present disclosure.
FIG. 25 is an explanatory diagram illustrating an example of screens displayed in the display section 110 of the image capturing apparatus 100 according to the embodiment of the present disclosure.
FIG. 26A is an explanatory diagram illustrating an example of a screen displayed in the display section 110 of the image capturing apparatus 100 according to the embodiment of the present disclosure.

FIG. 26B is an explanatory diagram illustrating an example of the screen displayed in the display section 110 of the image capturing apparatus 100 according to the embodiment of the present disclosure.

FIG. 26C is an explanatory diagram illustrating an example of the screen displayed in the display section 110 of the image capturing apparatus 100 according to the embodiment of the present disclosure.

FIG. 26D is an explanatory diagram illustrating an example of the screen displayed in the display section 110 of the image capturing apparatus 100 according to the embodiment of the present disclosure.

FIG. 27 is an explanatory diagram illustrating an example of a screen displayed in the display section 110 of the image capturing apparatus 100 according to the embodiment of the present disclosure.

FIG. 28 is an explanatory diagram illustrating an example of screens displayed in the display section 110 of the image capturing apparatus 100 according to the embodiment of the present disclosure.

FIG. 29 is an explanatory diagram illustrating an example of screens displayed in the display section 110 of the image capturing apparatus 100 according to the embodiment of the present disclosure.

DESCRIPTION OF EMBODIMENTS

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

<1. Explanation of related art>
<2. One embodiment of present disclosure>
 (Appearance example of image capturing apparatus)
 (Functional configuration example of image capturing apparatus)
 (Operation example of image capturing apparatus)
<3. Conclusion>

<1. Explanation of Related Art>

Before the preferred embodiment is described in detail, related art is firstly described. After the related art is described, the preferred embodiment will be described in detail.

FIG. 1 is an explanatory diagram illustrating the related art by which functions related to image capturing are associated with a plurality of shutter manipulation steps to thereby concurrently perform determination of an image capturing condition and the image capturing. In the related art, when a shutter button 10 of an image capturing apparatus 1 which records an image as digital data is caused to be in the half-shutter-press state by a user, a setting screen for a setting item set in advance (an exposure correction value in the example shown in FIG. 1) appears. A set value is displayed in a screen 2. Then, when the set value becomes a desired value, the user presses down the shutter button 10. At this time, the image capturing apparatus 1 executes image capturing processing and sets the image capturing condition. Note that the image capturing processing refers to processing for recording a still image or a moving image as digital data.

However, in the case of setting the image capturing condition in this way, only when the timing of obtaining the desired value coincides with timing of capturing an image, the user can execute the image capturing processing. Accordingly, the user might miss an opportunity of capturing an image. In addition, time for keeping the shutter button in the half-shutter-press state is long in this technology. For this reason, it is difficult for the user to manipulate image capturing and is also necessary to set the item in advance (in FIG. 1, the exposure correction value should have been set in advance as the setting item).

Hence, in one embodiment of the present disclosure to be described later, a description is given of a technology making it possible to cause the user to execute image capturing processing by causing the user to designate an image capturing condition with simple manipulation without forcing the user to perform special manipulation.

<2. One Embodiment of Present Disclosure>

(Appearance Example of Image Capturing Apparatus)

FIG. 2A is an explanatory diagram illustrating an appearance example of an image capturing apparatus 100 according to the embodiment of the present disclosure. The image capturing apparatus 100 according to the embodiment of the present disclosure is an apparatus which records images as digital data. FIG. 2A illustrates the back side of the image capturing apparatus 100. The image capturing apparatus 100 includes a display section 110 having a touch panel. The user who captures an image by using the image capturing apparatus 100 can manipulate the image capturing apparatus 100 by touching the display section 110 with his/her finger, a manipulating member, or the like.

The image capturing apparatus 100 according to the embodiment of the present disclosure displays as a handler a manipulation button 131 shown by a camera-shaped icon in the display section 110 to cause the user to touch the manipulation button 131, and thereby receives the user manipulation. The image capturing apparatus 100 according to the embodiment of the present disclosure executes processing based on the manipulation by the user on the manipulation button 131 displayed in the display section 110.

The image capturing apparatus 100 according to the embodiment of the present disclosure provides the manipulation button 131 for executing the image capturing processing with functions of causing the user to set an image capturing condition and displaying the thus set image capturing condition in the display section 110. In other words, the image capturing apparatus 100 according to the embodiment of the present disclosure associates the manipulation button 131 for executing the image capturing processing with the setting and the displaying of the image capturing condition. By displaying the manipulation button 131 in the display section 110 in this way, the image capturing apparatus 100 according to the embodiment of the present disclosure can cause the user to execute the image capturing processing by causing the user to designate the image capturing condition with simple manipulation without forcing the user to perform special manipulation.

Note that FIG. 2A illustrates the image capturing apparatus 100 including the display section 110 incorporated therein, but the embodiment of the present disclosure is not limited to the example. FIGS. 2B and 2C are explanatory diagrams respectively illustrating modifications of the image capturing apparatus 100 according to the embodiment of the present disclosure.

FIG. 2B illustrates an image capturing apparatus 100' and a display apparatus 110', the image capturing apparatus 100' executing the image capturing processing, the display apparatus 110' including a touch panel which displays a handler thereof and is provided for manipulating the image capturing apparatus 100'. The image capturing apparatus 100' and the display apparatus 110' are connected to each other in a wired or wireless manner. FIG. 2B illustrates the modification in which the image capturing apparatus 100' is operated by causing the user to touch the handler displayed in the display apparatus 110'.

FIG. 2C illustrates an image recording apparatus 100" and a display apparatus 110", the image recording apparatus 100" recording images, the display apparatus 110" including a touch panel which displays a handler and is provided for manipulating the image recording apparatus 100". The image recording apparatus 100" is, for example, a television receiver, a hard disk recorder, or the like, the television receiver having functions of receiving television broadcast and recording programs. The image recording apparatus 100" and the display apparatus 110" are connected to each other in a wired or wireless manner. FIG. 2C illustrates the modification in which the image capturing apparatus 100" is operated by causing the user to touch the handler displayed in the display apparatus 110'.

The technology according to the embodiment of the present disclosure is also applicable to even the case where an apparatus for actually executing processing and an apparatus for manipulating the apparatus for executing the processing are provided separately as illustrated in FIGS. 2B and 2C.

The appearance example of the image capturing apparatus 100 according to the embodiment of the present disclosure has heretofore been described. Next, a description is given of a functional configuration example of the image capturing apparatus 100 according to the embodiment of the present disclosure.

(Functional Configuration Example of Image Capturing Apparatus)

FIG. 3 is an explanatory diagram illustrating the functional configuration example of the image capturing apparatus 100 according to the embodiment of the present disclosure. Hereinbelow, the functional configuration example of the image capturing apparatus 100 according to the embodiment of the present disclosure the description will be described by using FIG. 3.

As illustrated in FIG. 3, the image capturing apparatus 100 according to the embodiment of the present disclosure includes an image capturing section 102, an image sensor I/F 104, a signal processing preprocessing section 106, a signal processing section 108, a display section 110, a display processing section 112, a posture detection section 114, a control section 116, a volatile memory section 118, a nonvolatile memory I/F 120, a nonvolatile memory section 122, an input processing section 124, and an input section 126.

The image capturing section 102 includes a lens, an imager including solid-state imaging devices such as CCDs (Charge Coupled Devices) or CMOS (ComplementaryMetal Oxide Semiconductors), a timing generator which controls exposure timing or the like for an image sensor, a sample holding circuit, an interface section for providing a circuit in a subsequent stage with original data of an image obtained by exposure to the imager, and the like. The original data of the image obtained by the image capturing section 102 is supplied to the signal processing preprocessing section 106 through the image sensor I/F 104.

The signal processing preprocessing section 106 executes, as preprocessing, processing of: generating YC data on the original image data transmitted from the image capturing section 102 through the image sensor I/F 104, for example, by performing interpolation of Bayer array image data; and executing predetermined image processing on the YC data, such as resolution conversion or contour enhancement. After executing the preprocessing on the original image data, the signal processing preprocessing section 106 supplies the volatile memory section 118 with the processed image data.

The signal processing section 108 executes signal processing on the image data on which the signal processing preprocessing section 106 performs the preprocessing and which is then stored in the volatile memory section 118. The signal processing executed by the signal processing section 108 is processing of, for example, changing the size of the image to be displayed in the display section 110, or compressing the image for storing the image in the nonvolatile memory section 122. After executing the signal processing on the image data, the signal processing section 108 supplies the data having undergone the signal processing to the display processing section 112 and the nonvolatile memory I/F 120.

The display section 110 displays the image based on the data supplied from the display processing section 112. Note that the display section 110 displays not only the image captured by the image capturing section 102 but also various pieces of setting information. The display section 110 is formed by, for example, a liquid crystal display panel or an organic EL panel. Note that a touch panel may be provided on a display surface of the display section 110.

The display processing section 112 executes processing of displaying the image in the display section 110. The display processing section 112 executes processing of displaying, in the display section 110, the image data whose image size is changed by the signal processing section 108, for example. The display processing section 112 also executes processing of displaying, in the display section 110, a menu or icons in accordance with manipulation of the input section 126 by the user.

The posture detection section 114 detects the posture of an enclosure of the image capturing apparatus 100. The posture detection section 114 includes, for example, an acceleration sensor having 1 to 3 axes and detects the posture of the enclosure of the image capturing apparatus 100 based on an acceleration value. When the posture detection section 114 detects the posture of the enclosure of the image capturing apparatus 100, the display processing section 112 can thereby change the placement direction of the image to be displayed in the display section 110 to a portrait direction or a landscape direction.

The control section 116 executes various computation and control processing for an operation of the image capturing apparatus 100. Examples of the computation and control processing executed by the control section 116 include: processing of detecting user input manipulation of the input section 126; time measurement in response to the detected input manipulation; and computation processing for the menu and the icons to be displayed in the display section 110. For the computation processing for the menu and for drawing the icons to be displayed on the display section 110, the control section 116 may use information on the posture of the enclosure of the image capturing apparatus 100 detected by the posture detection section 114. The control section 116 uses the volatile memory section 118 as a work memory for the various computation and control processing for the operation of the image capturing apparatus 100.

The control section 116 executes control for providing the manipulation button 131 with the functions as described above. Specifically, the control section 116 performs the control for providing the manipulation button 131 for executing the image capturing processing with functions of causing the user to set the image capturing condition and of displaying the image capturing condition in the display section 110. In other words, the control section 116 performs the control so that the manipulation button 131 for executing the image capturing processing is associated with the setting of the image capturing condition and the displaying of the image capturing condition.

The volatile memory section 118 is a memory temporarily storing the image data on which the signal processing preprocessing section 106 performs the preprocessing as described above. The volatile memory section 118 is the work memory used by the control section 116 for the various computation and control processing for the operation of the image capturing apparatus 100 as described above.

The nonvolatile memory I/F 120 includes a file system such as FATs (File Allocation Tables). The nonvolatile memory I/F 120 converts a recording format of the image data supplied from the signal processing section 108 into, for example, MPEG, and records the image data in the nonvolatile memory section 122 through the file system.

The nonvolatile memory section 122 is a recording medium, for example, incorporated in the image capturing apparatus 100 or attachable to and detachable from the image capturing apparatus 100, and is formed by, for example, a hard disk drive or a memory card having a built-in flash memory. The nonvolatile memory section 122 stores data of a still image or a moving image generated as a result of the image capturing processing by the image capturing apparatus 100.

The input processing section 124 transmits a signal from the input section 126 to the control section 116 to thereby supply the control section 116 with the content of the user input manipulation of the input section 126. Accordingly, the input processing section 124 is an example of a receiving section of the present disclosure. The input section 126 includes various switches and buttons for manipulating the image capturing apparatus 100. Examples of the switches and the buttons for manipulating the image capturing apparatus 100 include a power supply button, a shutter button, a zoom-in/out button (or a zoom-in/out key), and buttons for various settings. Note that the touch panel is provided on the display surface of the display section 110 in the present embodiment, and the touch panel is also included in the input section 126. The signal generated in response to the user manipulation of the input section 126 is received by the input processing section 124 and is transmitted from the input processing section 124 to the control section 116.

With the configuration as illustrated in FIG. 3, the image capturing apparatus 100 according to the embodiment of the present disclosure can cause the user to execute the image capturing processing by causing the user to designate the image capturing condition with simple manipulation without forcing the user to perform special manipulation, as described above.

The functional configuration example of the image capturing apparatus 100 according to the embodiment of the present disclosure has heretofore been described by using FIG. 3. Note that in the modifications illustrated in FIGS. 2B and 2C, at least the control section 116 illustrated in FIG. 3 is included in the display apparatus 110' and the display apparatus 110''.

Next, a description is given of an operation example of the image capturing apparatus 100 according to the embodiment of the present disclosure.

(Operation Example of Image Capturing Apparatus)

FIG. 4 is a flowchart illustrating the operation example of the image capturing apparatus 100 according to the embodiment of the present disclosure. FIG. 5 is an explanatory diagram illustrating an example of screens displayed in the display section 110 of the image capturing apparatus 100 according to the embodiment of the present disclosure. FIG. 4 illustrates the operation example of the image capturing apparatus 100 in the case where a handler is displayed in the display section 110 of the image capturing apparatus 100 and where the user performs manipulation input on the handler. FIG. 5 illustrates the image capturing button 131 as an example of the handler displayed in the display section 110, the image capturing button 131 being indicated by the camera-shaped icon. The image capturing button 131 is a button for executing the image capturing processing, but serves as a button for executing different processing from the image capturing processing if a particular condition is satisfied. Hereinafter, the operation example of the image capturing apparatus 100 according to the embodiment of the present disclosure will be described by using FIGS. 4 and 5.

Firstly, the processing of the image capturing apparatus 100 stands by in the control section 116 until user manipulation of the input section 126 is detected (Step S101). Then, when the control section 116 detects the user manipulation of the input section 126, the image capturing apparatus 100 subsequently causes the control section 116 to determine whether the user manipulation of the input section 126 is a touch on a camera-through image which is displayed in the display section 110 and is being captured by the image capturing section 102 (Step S102).

Note that in the following description, the camera-through image being captured by the image capturing section 102 is also referred to as an "EE image" (Electric-to-Electric image: an image outputted from image sensors is displayed in a finder or on a liquid crystal panel, while the captured image is not recorded).

When the control section 116 determines in Step S102 described above that the user manipulation of the input section 126 is the touch on the EE image displayed in the display section 110, the image capturing apparatus 100 causes the control section 116 to perform control so that focusing is performed at the touch position (Step S103). When the focusing is performed at the touch position, the image capturing apparatus 100 causes the control section 116 to start time measurement (Step S104). Note that if the time measurement has already been started, the control section 116 cancels the measured time to reset and restart the time measurement from the beginning. After the control section 116 starts the time measurement, the processing of the image capturing apparatus 100 moves back to Step S101 described above.

When the control section 116 determines in Step S102 described above that the user manipulation of the input section 126 is not the touch on the EE image displayed in the display section 110, the image capturing apparatus 100 subsequently causes the control section 116 to determine whether the user manipulation of the input section 126 is a touch on the image capturing button 131 displayed in the display section 110 (Step S105).

When the control section 116 determines in Step S105 described above that the user manipulation of the input section 126 is the touch on the image capturing button 131 displayed in the display section 110, the image capturing apparatus 100 subsequently causes the control section 116 to determine whether measured time started in Step S104 described above is within a predetermined time (Step S106).

When the control section 116 determines in Step S106 that the measured time started in Step S104 described above is within the predetermined time, the image capturing apparatus 100 subsequently causes the control section 116 to perform control so that the image capturing processing in accordance with the setting content linked to the image capturing button 131 is executed (Step S107).

On the other hand, when the control section 116 determines in Step S106 that the time measurement is not started in Step S104 described above, or when the measured time from the start of the time measurement is not within the predetermined time even though the time measurement is started, the image capturing apparatus 100 subsequently causes the control section 116 to perform control so that a setting item menu is opened in the display section 110 (Step S108). The user of the image capturing apparatus 100 sets a setting item by manipulating the setting item menu displayed in the display section 110 in Step S108 (Step S109).

The image capturing apparatus 100 subsequently stands by until the user touches the image capturing button 131 displayed in the display section 110 (Step S110). When it is determined in Step S110 that user manipulation of the input section 126 is a touch on the image capturing button 131 displayed in the display section 110, the image capturing apparatus 100 causes the control section 116 to perform control so that the setting item menu displayed in the display section 110 is closed and so that the setting item linked to the image capturing button 131 is updated according to the setting item (Step S111). In addition, as will be described later, if the image capturing button 131 is provided with appended display, the control section 116 may perform control so that the content of the appended display is updated.

If the time measurement has been started in Step S104 described above, the image capturing apparatus 100 causes the control section 116 to perform control so that the time measurement is terminated (Step S112) on condition that one of the following is satisfied. The conditions are: it is determined in Step S105 described above that the user manipulation of the input section 126 is not the touch on the image capturing button 131 displayed in the display section 110; the image capturing processing in Step S107 described above is terminated; and the update processing in Step S111 described above is terminated.

The processing described above will be described in more detail by using FIG. 5. Here, FIG. 5 illustrates time series to the right and then to the lower row. When the user touches the image capturing button 131 displayed in the display section 110 with his/her finger, a pen, or the like, the control section 116 performs the control so that the setting item menu is opened in the display section 110. The user can change the setting for the image capturing processing by touching the setting item menu displayed in the display section 110 with his/her finger, a pen, or the like. The example in FIG. 5 shows the case where an item of "image size" is selected to change "image size" from "L" to "M", and corresponds to the processing in Step S109 in FIG. 4. Note that the "image size" item is provided for setting the size of an image to be obtained in the image capturing processing.

When the "image size" item is selected and "image size" is changed from "L" to "M", the control section 116 again performs the control so that the setting item menu is opened in the display section 110. Then, when the user touches the image capturing button 131 displayed in the display section 110 with his/her finger, a pen, or the like, the control section 116 performs control so that the setting item menu displayed in the display section 110 is closed. This corresponds to the processing in Step S111 in FIG. 4.

When the user touches the EE image displayed in the display section 110 with his/her finger, a pen, or the like, the control section 116 performs control so that focusing is performed at the touch position. This corresponds to the processing in Step S103 in FIG. 4. Further, when the user touches the image capturing button 131 within the predetermined time to elapse after the touch on the EE image, the control section 116 performs control so that the image capturing processing in accordance with the setting content linked to the image capturing button 131 is executed. This corresponds to the processing in Step S107 in FIG. 4.

The image capturing apparatus 100 according to the embodiment of the present disclosure operates in this way and thereby can link the settings of the image capturing conditions to the image capturing button 131. By linking the settings of the image capturing conditions to the image capturing button 131, it is possible to cause the user to execute the image capturing processing by causing the user to designate any of the image capturing conditions with simple manipulation without forcing the user to perform special manipulation.

FIG. 5 illustrates the example of the screens displayed in the display section 110 in the case where the image capturing apparatus 100 captures a still image. Next, a description is given of an example of screens displayed in the display section 110 in the case where the image capturing apparatus 100 captures a moving image. FIG. 6 is an explanatory diagram illustrating an example of screens displayed in the display section 110 of the image capturing apparatus 100 according to the embodiment of the present disclosure. FIG. 6 illustrates the example of the screens displayed in the display section 110 in the case where an image capturing setting is changed in the course of the image capturing processing from setting for a still image to setting for a moving image.

If the user touches the setting item menu displayed in the display section 110 with his/her finger, a pen, or the like to change the image capturing setting from the setting for a still image to the setting for a moving image (the leftmost screen in the middle row in FIG. 6), the control section 116 performs control so that an image capturing button 132 indicated by another icon is displayed in the display section 110. By changing the displayed button between the case of capturing a still image and capturing a moving image, the control section 116 can show the user in an easy-to-understand manner whether a still image or a moving image is captured.

The image capturing apparatus 100 may display, near the image capturing buttons 131 and 132, all or at least one of the settings linked to each of the image capturing buttons 131 and 132 or information on the image capturing processing. FIGS. 7A and 7B are explanatory diagrams each illustrating an example of a screen displayed in the display section 110 of the image capturing apparatus 100 according to the embodiment of the present disclosure.

FIG. 7A illustrates the example in which one of the settings linked to the image capturing button 131 for capturing a still image and the number of images which can be captured as information on the image capturing processing are displayed under the image capturing button 131 in the display section 110. FIG. 7B illustrates the example in which one of the settings linked to the image capturing button 132 for capturing a moving image and time in which an image can be captured as information on the image capturing processing are displayed under the image capturing button 132 in the display section 110. In this way, all or at least one of the settings linked to the image capturing buttons 131 and 132 is displayed near the image capturing buttons 131 and 132, and thereby the image capturing apparatus 100 can show the user in the easy-to-understand manner what settings of the image capturing buttons 131 and 132 are used for executing the image capturing processing.

The examples in which only one of the image capturing buttons 131 and 132 is displayed in the display section 110 have been heretofore described, but the embodiment of the present disclosure is not limited to the examples. For example, a plurality of image capturing buttons may be displayed concurrently in the display section 110.

FIGS. 7C and 7D are explanatory diagrams each illustrating an example of a screen displayed in the display section 110 of the image capturing apparatus 100 according to the embodiment of the present disclosure. FIG. 7C illustrates the case where two image capturing buttons 131a and 131b for capturing still images are displayed concurrently in the display section 110 and where one of the settings linked to each of the image capturing buttons 131a and 131b and the number of images which can be captured as information on the image capturing processing are displayed under each of the image capturing buttons 131a and 131b in the display section 110. FIG. 7D illustrates the case where two image capturing buttons 132a and 132b for capturing moving images are displayed concurrently in the display section 110 and where one of the settings linked to each of the image capturing buttons 132a and 132b and time in which an image can be captured as information on the image capturing processing are displayed under each of the image capturing buttons 131a and 131b in the display section 110. In this way, the plurality of image capturing buttons are displayed concurrently in the display section 110, and the different image capturing conditions are linked to the respective image capturing buttons. Thereby, the image capturing apparatus 100 can save the user's labor of changing the setting as much as possible.

It goes without saying that the image capturing apparatus 100 may concurrently display in the display section 110 an image capturing button for capturing a still image and an image capturing button for capturing a moving image. FIG. 7E is an explanatory diagram illustrating an example of a screen displayed in the display section 110 of the image capturing apparatus 100 according to the embodiment of the present disclosure. FIG. 7E illustrates an example in which the image capturing button 131 for capturing a still image and the image capturing button 132 for capturing a moving image are concurrently displayed in the display section 110 and where one of the settings linked to each of the image capturing buttons 131 and 132 and the number of images which can be captured or time in which an image can be captured as information on the image capturing processing are displayed under each of the image capturing buttons 131a and 131b in the display section 110.

Heretofore, the examples in which the one EE image is displayed in the display section 110 have been described, but the embodiment of the present disclosure is not limited to the examples. For example, the image capturing apparatus 100 may concurrently display a plurality of EE images in the display section 110. The plurality of EE images may be generated from different images (for example, an ordinary image and an enlarged image) processed by the same image capturing section 102. If the image capturing apparatus 100 is provided with a plurality of different image capturing sections 102, the EE images may be generated from images processed by the respective image capturing sections 102.

Hereinbelow, a description is given of an operation example of the image capturing apparatus 100 in the case of displaying the EE images in the display section 110.

FIG. 8 is a flowchart illustrating an operation example of the image capturing apparatus 100 according to the embodiment of the present disclosure. FIG. 9 is an explanatory diagram illustrating an example of a screen displayed in the display section 110 of the image capturing apparatus 100 according to the embodiment of the present disclosure. FIG. 8 illustrates the operation example of the image capturing apparatus 100 in the case where handlers are displayed in the display section 110 of the image capturing apparatus 100 and where the user inputs manipulation through the handlers. FIG. 9 illustrates the image capturing buttons 131 and 132 as examples of the handlers displayed in the display section 110, the image capturing buttons 131 and 132 being indicated by the camera-shaped icons. The image capturing buttons 131 and 132 are buttons for executing the image capturing processing, but serve as buttons for executing different processing from the image capturing processing if a particular condition is satisfied. Hereinbelow, the operation example of the image capturing apparatus 100 according to the embodiment of the present disclosure will be described by using FIGS. 8 and 9.

Differences of the flowchart illustrated in FIG. 8 from the flowchart illustrated in FIG. 4 lie in that: when the user touches an EE image, which one of EE images is selected by the touch is stored (Step S123); and the image capturing processing is executed on an image corresponding to the selected EE image, based on settings linked to the image capturing button touched by the user (Step S128).

The image capturing apparatus 100 detects manipulation by the user (Step S121), and determines whether the manipulation is a touch on an EE image (Step S122). When the manipulation is a touch on an EE image, the image capturing apparatus 100 causes the control section 116 to perform control so that which one of EE images is selected by the touch is stored (Step S123). Thereafter, as in the processing illustrated in FIG. 4, the image capturing apparatus 100 focuses at a user's touch position (Step S124), and starts time measurement (Step S125).

On the other hand, when the manipulation by the user is not a touch on an EE image, the image capturing apparatus 100 subsequently determines whether the manipulation by the user is a touch on any of the image capturing buttons 131 and 132 (Step S126). When the manipulation is a touch on the image capturing button 131 or 132, the image capturing apparatus 100 causes the control section 116 to determine whether measured time started in the Step S125 described above is within a predetermined time (Step S127). When the control section 116 determines in Step S127 that the measured time started in Step S125 described above is within the predetermined time, the image capturing apparatus 100 subsequently causes the control section 116 to perform control so that the image capturing section 102 corresponding to the EE image stored in Step S123 described above executes the image capturing processing based on the setting content linked to the touched image capturing button 131 or 132 (Step S128).

On the other hand, when the control section 116 determines in Step S127 that the time measurement is not started in Step S125 described above, or when the measured time from the start of the time measurement is not within the predetermined time even though the time measurement is started, the image capturing apparatus 100 subsequently causes the control section 116 to perform control so that the setting item menu is opened in the display section 110 (Step S129). The user of the image capturing apparatus 100 can set a setting item by manipulating the setting item menu displayed in the display section 110 in Step S129 (Step S130). The image capturing apparatus 100 subsequently stands by until the user touches the image capturing button 131 or 132 displayed in the display section 110 (Step S131). When the user manipulation of the input section 126 is the touch on the image capturing button 131 or 132 displayed in the display section 110, the image capturing apparatus 100 causes the control section 116 to perform control so that the setting item menu displayed in the display section 110 is closed and so that the setting item linked to the image capturing button 131 or 132 is updated according to the setting item (Step S132).

If the time measurement has been started in Step S125 described above, the image capturing apparatus 100 causes the control section 116 to perform control so that the time measurement is terminated (Step S133) on condition that one of the following is satisfied. The conditions are: it is determined in Step S126 described above that the user manipulation of the input section 126 is not the touch on the image capturing button 131 or 132 displayed in the display section 110; the image capturing processing in Step S128 described above is terminated; and the update processing in Step S132 described above is terminated.

FIG. 9 illustrates a state in which two EE images (an EE image A and an EE image B) and the two image capturing buttons 131 and 132 are displayed in the display section 110. When selecting one of the two EE images by the touch or the like on the EE image, the user can thereby capture an image corresponding to the EE image. In addition, when selecting one of the image capturing buttons 131 and 132 in the image capturing by the touch or the like on the image capturing button 131 or 132, the user can thereby cause the image capturing apparatus 100 to perform the image capturing processing based on the image capturing conditions linked to the image capturing button 131 or 132.

The aforementioned example shows the case where the image capturing apparatus 100 displays the two image capturing buttons 131 and 132 in the display section 110, but the embodiment of the present disclosure is not limited to the example. Nevertheless, there is a case where the display section 110 is prevented from displaying, for example, three or more image capturing buttons due to restriction on the screen size thereof. In such a case, the image capturing apparatus 100 may have a scrollable region for displaying the image capturing buttons in the display section 110.

FIGS. 10 and 11 are flowcharts illustrating an operation example of the image capturing apparatus 100 according to the embodiment of the present disclosure. FIG. 12 is an explanatory diagram illustrating an example of screens displayed in the display section 110 of the image capturing apparatus 100 according to the embodiment of the present disclosure. FIGS. 10 and 11 illustrate the operation example of the image capturing apparatus 100 in the case where handlers are displayed in the display section 110 of the image capturing apparatus 100 and where the user inputs manipulation through the handlers. FIG. 12 illustrates the image capturing buttons 131 and 132 and an image capturing button 133 as examples of the handlers displayed in the display section 110, the image capturing buttons 131, 132, and 133 being indicated by the camera-shaped icons. The image capturing buttons 131, 132, and 133 are buttons for executing the image capturing processing, but serve as buttons for executing different processing from the image capturing processing if a particular condition is satisfied. In addition, FIG. 12 illustrates the display example in which only up to two image capturing buttons are allowed to be concurrently displayed in the display section 110. Hereinbelow, the operation example of the image capturing apparatus 100 according to the embodiment of the present disclosure will be described by using FIGS. 10 to 12.

Differences of the flowcharts illustrated FIGS. 10 and 11 from the flowchart illustrated in FIG. 4 lie in that: when the user slides an image capturing button, the image capturing apparatus 100 detects the manipulation (Step S153); and in accordance with the user's sliding manipulation of the image capturing button, the image capturing apparatus 100 slides the image capturing button (Step S154).

The image capturing apparatus 100 detects manipulation by the user (Step S141), and determines whether the manipulation is a touch on an EE image (Step S142). When the manipulation is a touch on an EE image, the image capturing apparatus 100 focuses at a user's touch position (Step S143), and starts time measurement (Step S144), as in the processing illustrated in FIG. 4.

On the other hand, when the manipulation by the user is not a touch on an EE image, the image capturing apparatus 100 subsequently determines whether the manipulation by the user is a touch on any of the image capturing buttons 131, 132, and 133 (Step S145). When the manipulation is a touch on the image capturing button 131, 132, or 133, the image capturing apparatus 100 causes the control section 116 to determine whether measured time started in the Step S144 described above is within a predetermined time (Step S146). When the control section 116 determines in Step S146 that the measured time started in Step S144 described above is within the predetermined time, the image capturing apparatus 100 subsequently causes the control section 116 to perform control so that the image capturing processing is executed based on the setting content linked to the touched image capturing button 131, 132, or 133 (Step S147).

On the other hand, when the control section 116 determines in Step S146 that the time measurement is not started in Step S144 described above, or when the measured time from the start of the time measurement is not within the predetermined time even though the time measurement is started, the image capturing apparatus 100 subsequently causes the control section 116 to perform control so that the setting item menu is opened in the display section 110 (Step S148). The user of the image capturing apparatus 100 sets a setting item by manipulating the setting item menu displayed in the display section 110 in Step S148 (Step S149). The image capturing apparatus 100 subsequently stands by until the user touches the image capturing button 131, 132, or 133 displayed in the display section 110 (Step S150). When the user manipulation of the input section 126 is the touch on the image capturing button 131, 132, or 133 displayed in the display section 110, the image capturing apparatus 100 causes the control section 116 to perform control so that the setting item menu displayed in the display section 110 is closed and so that the setting item linked to the image capturing button 131, 132, or 133 is updated according to the setting item (Step S151).

Meanwhile, when it is determined in Step S145 described above that the user manipulation of the input section 126 is not a touch on the image capturing button 131, 132, or 133 displayed in the display section 110, the image capturing apparatus 100 causes the control section 116 to determine whether the user manipulation of the input section 126 is the sliding manipulation of the image capturing button 131, 132, or 133 displayed in the display section 110 (Step S153).

When it is determined in Step S153 that the user manipulation of the input section 126 is the sliding manipulation of the image capturing button 131, 132, or 133 displayed in the display section 110, the image capturing apparatus 100 causes the control section 116 to control display in which the image capturing button 131, 132, or 133 displayed in the display section 110 is slid (Step S154).

If the time measurement has been started in Step S144 described above, the image capturing apparatus 100 causes the control section 116 to perform control so that the time measurement is terminated (Step S152) on condition that one of the following is satisfied. The conditions are: it is determined in Step S153 described above that the user manipulation of the input section 126 is not the sliding manipulation of the image capturing button 131, 132, or 133 displayed in the display section 110; the image capturing processing in Step S147 described above is terminated; and the update processing in Step S151 described above is terminated.

FIG. 12 illustrates an example of displaying the sliding of the image capturing button 131, 132, or 133 displayed in the display section 110. The control section 116 controls the displaying of the scrolling of one of the icons displayed as the image capturing buttons 131, 132, and 133 in accordance with sliding manipulation of the icon itself or around the icon. Even if there are too many image capturing buttons to be displayed concurrently in the display section 110, the image capturing apparatus 100 enables user manipulation by controlling the icon scrolling display in this way.

Note that not only the image capturing buttons displayed in the display section 110 but also EE images may be scrollable. Even if the plurality of EE images are not allowed to be displayed concurrently in the display section 110, making the EE images scrollable enables the image capturing apparatus 100 to execute the operation as illustrated in FIG. 8.

FIG. 13 is an explanatory diagram illustrating an example of screens displayed in the display section 110 of the image capturing apparatus 100 according to the embodiment of the present disclosure. FIG. 13 illustrates the display example in which only up to one EE image is allowed to be displayed concurrently in the display section 110. When the user executes not a touch but sliding manipulation an EE image displayed in the display section 110, the control section 116 performs control so that the EE image is slidably displayed in the same manner as in sliding the image capturing button 131, 132, or 133 illustrated in FIG. 12.

Next, a description is given of an operation example of the image capturing apparatus 100 in the cases where the image capturing apparatus 100 is used to execute continuous image capturing of still images and to execute recording of a moving image. As has been described, image capturing conditions are linked to the image capturing buttons. Thereby, changing the display of an icon displayed as a corresponding one of the image capturing buttons enables the image capturing apparatus 100 to show the user in the easy-to-understand manner what kind of image capturing processing is executed based on the image capturing button and whether or not continuous image capturing processing or processing of moving image capturing is currently executed.

FIGS. 14 and 15 are flowcharts illustrating an operation example of the image capturing apparatus 100 according to the embodiment of the present disclosure. FIG. 16 is an explanatory diagram illustrating an example of screens displayed in the display section 110 of the image capturing apparatus 100 according to the embodiment of the present disclosure. FIGS. 14 and 15 illustrate the operation example of the image capturing apparatus 100 in the case where a handler is displayed in the display section 110 of the image capturing apparatus 100 and where the user performs manipulation input on the handler. FIG. 16 illustrates one of the image capturing buttons 131 and 132 as an example of the handler displayed in the display section 110, the image capturing button 131 or 132 being indicated by the camera-shaped icon. The image capturing button 131 or 132 is the button for executing the image capturing processing, but serves as a button for executing different processing from the image capturing processing if a particular condition is satisfied. Hereinbelow, the operation example of the image capturing apparatus 100 according to the embodiment of the present disclosure will be described by using FIGS. 14 to 16.

A difference of the flowcharts illustrated in FIGS. 14 and 15 from the flowchart illustrated in FIG. 4 lies in that when the image capturing apparatus 100 executes continuous image capturing of still images or executes recording of a moving image in response to the user's touch on the image capturing button, the display of the image capturing button 131 or 132 is changed (Step S173).

The image capturing apparatus 100 detects manipulation by the user (Step S161), and determines whether the manipulation is a touch on an EE image (Step S162). When the manipulation is a touch on an EE image, the image capturing apparatus 100 focuses at a user' touch position (Step S163), and starts time measurement (Step S164), as in the processing illustrated in FIG. 4.

On the other hand, when the manipulation by the user is not a touch on an EE image, the image capturing apparatus 100 subsequently determines whether the manipulation by the user is a touch on any of the image capturing buttons 131 and 132 (Step S165). When the manipulation is a touch on the image capturing button 131 or 132, the image capturing apparatus 100 causes the control section 116 to determine whether measured time started in the Step S164 described above is within a predetermined time (Step S166). When the control section 116 determines in Step S166 that the measured time started in Step S164 described above is within the predetermined time, the image capturing apparatus 100 subsequently causes the control section 116 to perform control so that the continuous image capturing processing or the moving image capturing processing is executed based on the setting content linked to the touched image capturing button 131 or 132 (Step S167).

When the continuous image capturing processing or the moving image capturing processing is executed, the image capturing apparatus 100 subsequently causes the control section 116 to perform control so that the display of the image capturing button 131 or 132 is changed to display indicating a state where continuous image capturing or recording is being executed (Step S173). Then, the image capturing apparatus 100 stands by until the user touches on the image capturing button 131 or 132 (Step S174). When the user touches the image capturing button 131 or 132, the image capturing apparatus 100 causes the control section 116 to perform control so that the display of the image capturing button 131 or 132 is changed to display indicating a state where the continuous image capturing or the recording is terminated (that is, an ordinary state) and so that the continuous image capturing processing or the recording processing is terminated (Step S175).

On the other hand, when the control section 116 determines in Step S166 that the time measurement is not started in Step S164 described above, or when the measured time from the start of the time measurement is not within the predetermined time even though the time measurement is started, the image capturing apparatus 100 subsequently causes the control section 116 to perform control so that the setting item menu is opened in the display section 110 (Step S168). The user of the image capturing apparatus 100 sets a setting item by manipulating the setting item menu displayed in the display section 110 in Step S168 (Step S169). The image capturing apparatus 100 subsequently stands by until the user touches the image capturing button 131 or 132 displayed in the display section 110 (Step S170). When the user manipulation of the input section 126 is the touch on the image capturing button 131 or 132 displayed in the display section 110, the image capturing apparatus 100 causes the control section 116 to perform control so that the setting item menu displayed in the display section 110 is closed and so that the setting item linked to the image capturing button 131 or 132 is updated according to the setting item (Step S171).

If the time measurement has been started in Step S164 described above, the image capturing apparatus 100 causes the control section 116 to perform control so that the time measurement is terminated (Step S172) on condition that one of the following is satisfied. The conditions are: it is determined in Step S165 described above that the user manipulation of the input section 126 is not the touch on the image capturing button 131 or 132 displayed in the display section 110; the update processing in Step S171 described above is terminated; and the continuous image capturing processing or recording processing in Step S175 described above is terminated.

By using FIG. 16, a description is given of the displaying of the image capturing button 131 when the image capturing apparatus 100 according to the embodiment of the present disclosure executes the continuous image capturing processing. When the user touches an EE image and then touches the image capturing button 131 set in advance to execute the continuous image capturing processing, the image capturing apparatus 100 executes the continuous image capturing processing. At this time, as illustrated in FIG. 16, the image capturing apparatus 100 according to the embodiment of the present disclosure causes the control section 116 to perform control so that the EE image is superposed on the image capturing button 131 displayed in the display section 110 and so that an image (a review image) obtained by the image capturing processing is displayed in a region where the EE image has been displayed. Then, upon detection of the user's touch on the image capturing button 131 during execution of the continuous image capturing processing, the image capturing apparatus 100 causes the control section 116 to perform control so that the continuous image capturing processing is terminated. After terminating the continuous image capturing processing, the image capturing apparatus 100 according to the embodiment of the present disclosure causes the control section 116 to perform control so that the superposition of the EE image on the image capturing button 131 is stopped.

As illustrated in FIG. 16, changing the display state of the image capturing button 131 enables the image capturing apparatus 100 according to the embodiment of the present disclosure to show the user in the easy-to-understand manner whether the continuous image capturing processing is being executed.

Note that in the aforementioned example, the continuous image capturing processing is started in response to the user's touch on the image capturing button 131 set to execute the continuous image capturing processing, and the continuous image capturing processing is terminated in response to the user's touch on the image capturing button 131 during the execution of the continuous image capturing processing, but the embodiment of the present disclosure is not limited to the example.

FIG. 17 is an explanatory diagram illustrating an example of screens displayed in the display section 110 of the image capturing apparatus 100 according to the embodiment of the present disclosure. FIG. 17 illustrates the display example of the case where the user causes the image capturing apparatus 100 to execute the continuous image capturing processing by keeping touching the image capturing button 131 set to execute the continuous image capturing processing. Note that in this case, the image capturing apparatus 100 does not have to change the display of the image capturing button 131 as in FIG. 17.

FIG. 18 is an explanatory diagram illustrating an example of screens displayed in the display section 110 of the image capturing apparatus 100 according to the embodiment of the present disclosure. FIG. 18 illustrates the display example of the case where the recording processing is started in response to the user's touch on the image capturing button 132 set to execute the moving image recording processing and where the recording processing is terminated in response to the user's touch on the image capturing button 132 during the execution of the recording processing.

As illustrated in FIG. 18, when the user touches an EE image and then touches the image capturing button 132 set in advance to execute the moving image recording processing, the image capturing apparatus 100 executes the recording processing. At this time, as illustrated in FIG. 18, the image capturing apparatus 100 according to the embodiment of the present disclosure causes the control section 116 to perform control so that the EE image is superposed on the image capturing button 132 displayed in the display section 110 and so that an image (a recorded image) obtained by the image capturing processing is displayed in the region where the EE image has been displayed. Then, when the user touches the image capturing button 132 in the course of the recording processing executed by the image capturing apparatus 100, the image capturing apparatus 100 causes the control section 116 to perform control so that the recording processing is terminated. After terminating the recording processing, the image capturing apparatus 100 causes the control section 116 to perform control so that the superposition of the EE image on the image capturing button 132 is stopped.

As illustrated in FIG. 18, changing the display state of the image capturing button 132 enables the image capturing apparatus 100 according to the embodiment of the present disclosure to show the user in the easy-to-understand manner whether the moving image recording processing is being executed.

Note that in the aforementioned example, the moving image recording processing is started in response to the user's touch on the image capturing button 132 set to execute the moving image recording processing, and the moving image recording processing is terminated in response to the user's touch on the image capturing button 132 during the execution of the moving image recording processing, but the embodiment of the present disclosure is not limited to the example.

FIG. 19 is an explanatory diagram illustrating an example of screens displayed in the display section 110 of the image capturing apparatus 100 according to the embodiment of the present disclosure. FIG. 19 illustrates the display example of the case where the user causes the image capturing apparatus 100 to execute the moving image recording processing by keeping touching the image capturing button 132 set to execute the moving image recording processing. Note that in this case, the image capturing apparatus 100 does not have to change the display of the image capturing button 132 as in FIG. 19.

The image capturing apparatus 100 according to the embodiment of the present disclosure can associate the image capturing button with any of the image capturing conditions, but may change the display of the image capturing button to be displayed in the display section 110 in accordance with the setting content of the image capturing condition.

FIG. 20 is an explanatory diagram illustrating display examples of the image capturing buttons 131 and 132 displayed in the display section 110 of the image capturing apparatus 100 according to the embodiment of the present disclosure. In displaying the image capturing buttons 131 and 132, the image capturing apparatus 100 may change the display of the image capturing buttons 131 and 132 in such a manner as to, for example, animate each icon therefor (the left-most examples), change the color of each icon as a whole (the second examples from the left), change the color of each icon partially (the third examples from the left), blink each icon as a whole (the fourth examples from the left), blink each icon partially (the fifth examples from the left), or display an EE image on each icon (the right-most examples).

FIG. 21 is an explanatory diagram illustrating display examples of the image capturing buttons 131 and 132 displayed in the display section 110 of the image capturing apparatus 100 according to the embodiment of the present disclosure. The image capturing apparatus 100 may change the display of the image capturing buttons 131 and 132 in such a manner as to, for example, change the display using appended characters for each icon (the left-most example in the upper row in FIG. 21), change the color of each icon itself (the examples in the middle), add another icon (the left-most and middle examples in the lower row), or change the size of each icon (the right-most examples).

The image capturing apparatus 100 according to the embodiment of the present disclosure may display the setting items of the photographing conditions in various formats in the display section 110. FIG. 22 illustrates setting item examples of photographing conditions displayed in the display section 110 by the image capturing apparatus 100 according to the embodiment of the present disclosure. As illustrated in FIG. 22, the image capturing apparatus 100 according to the embodiment of the present disclosure may display only settable items (the upper right and left examples) or may display all the items with settable items displayed in a different font or background color (the lower right and left examples). Note that it is possible to set any manipulation for photographing itself or for setting the photographing conditions, in the image capturing apparatus 100 according to the embodiment of the present disclosure.

As described above, the image capturing apparatus 100 according to the embodiment of the present disclosure have the icon shapes different between the image capturing button 131 for capturing still images and the image capturing button 132 for capturing moving images. However, it goes without saying that the icon shapes are not limited to those illustrated in the drawings used in the foregoing descriptions.

FIG. 23 is an explanatory diagram illustrating display examples of the image capturing buttons 131 and 132 displayed in the display section 110 of the image capturing apparatus 100 according to the embodiment of the present disclosure. FIG. 23 illustrates examples of the icon of the image capturing button 131 for capturing still images in the upper row of FIG. 23 and examples of the icon of the image capturing button 132 for capturing moving images in the lower row.

The left-most example in the upper row illustrates the image capturing button 131 by using the camera-shaped icon. The example in the middle of the upper row illustrates the image capturing button 131 by using a still image (or a thumbnail still image). The example in the middle of the upper row illustrates the image capturing button 131 by using an icon shaped into a folder storing a still image.

The left-most example in the lower row illustrates the image capturing button 132 by using an icon having a different camera shape from that for a still image. The left-most example in the lower row illustrates the image capturing button 132 by using an image in a certain frame of a moving image (or a thumbnail image in a certain frame of a moving image). The right-most example in the lower row illustrates the image capturing button 132 by using an icon shaped into a folder storing a moving image.

When a time longer than the predetermined time elapses after the user touches on an EE image and when the user thereafter touches the image capturing button 131, the image capturing apparatus 100 according to the embodiment of the present disclosure displays the setting item in the display section 110 and enables the user to change the setting of the image capturing condition. However, the image capturing apparatus 100 may cause the control section 116 to perform control so that only the displaying of the image capturing conditions is executed.

FIG. 24 is a flowchart illustrating an operation example of the image capturing apparatus 100 according to the embodiment of the present disclosure. FIG. 25 is an explanatory diagram illustrating an example of screens displayed in the display section 110 of the image capturing apparatus 100 according to the embodiment of the present disclosure. FIG. 24 illustrates the operation example of the image capturing apparatus 100 in the case where a handler is displayed in the display section 110 of the image capturing apparatus 100 and where the user performs manipulation input on the handler. FIG. 25 illustrates the image capturing button 131 as an example of the handler displayed in the display section 110, the image capturing button 131 being indicated by the camera-shaped icon. The image capturing button 131 is the button for executing the image capturing processing, but serves as a button for executing different processing from the image capturing processing if a particular condition is satisfied. Hereinbelow, the operation example of the image capturing apparatus 100 according to the embodiment of the present disclosure will be described by using FIGS. 24 and 25.

A difference of the flowchart illustrated in FIG. 24 from the flowchart illustrated in FIG. 4 lies in that when a time longer than the predetermined time elapses after the user touches on an EE image and when the user thereafter touches the image capturing button 131, the image capturing apparatus 100 executes only displaying image capturing conditions (Step S188).

The image capturing apparatus 100 detects manipulation by the user (Step S181), and determines whether the manipulation is a touch on an EE image (Step S182). When the manipulation is a touch on an EE image, the image capturing apparatus 100 focuses at a user' touch position (Step S183), and starts time measurement (Step S184), as in the processing illustrated in FIG. 4.

On the other hand, when the manipulation by the user is not a touch on an EE image, the image capturing apparatus 100 subsequently determines whether the manipulation by the user is a touch the image capturing button 131 (Step S185). When the manipulation is a touch on the image capturing button 131, the image capturing apparatus 100 causes the control section 116 to determine whether measured time started in the Step S184 described above is within a predetermined time (Step S186). When the control section 116 determines in Step S186 that the measured time started in Step S184 described above is within the predetermined time, the image capturing apparatus 100 subsequently causes the control section 116 to perform control so that the image capturing processing in accordance with the setting content linked to the image capturing button 131 is executed (Step S187).

On the other hand, when the control section 166 determines in Step S186 that the time measurement is not started in Step S184 described above, or when the measured time from the start of the time measurement is not within the predetermined time even though the time measurement is started, the image capturing apparatus 100 subsequently causes the control section 116 to perform control so that the setting item menu is opened in the display section 110 (Step S188). The image capturing apparatus 100 subsequently stands by until the user manipulates the input section 126 (Step S189). When the control section 116 detects the user manipulation of the input section 126, the image capturing apparatus 100 causes the control section 116 to perform control so that the setting item menu displayed in the display section 110 is closed (Step S190).

If the time measurement has been started in Step S184 described above, the image capturing apparatus 100 causes the control section 116 to perform control so that the time measurement is terminated (Step S191) on condition that one of the following is satisfied. The conditions are: it is determined in Step S185 described above that the user manipulation of the input section 126 is not the touch on the image capturing button 131 displayed in the display section 110; the processing of closing the display of the image capturing conditions in Step S190 described above is terminated; and the image capturing processing in Step S187 described above is terminated.

By using FIG. 25, a description is given of transitions of a screen in the case where the image capturing apparatus 100 executes only displaying the image capturing conditions. When a time longer than the predetermined time elapses after the user touches on an EE image and when the user thereafter touches the image capturing button 131, the processing of displaying image capturing conditions linked to the image capturing button 131 is executed. Thereafter, when the user touches the image capturing button 131, the image capturing apparatus 100 causes the control section 116 to perform control so that the display of the image capturing conditions in the display section 110 is closed. In contrast, when the user touches the image capturing button 131 within the predetermined time after a touch on an EE image, the image capturing apparatus 100 causes the control section 116 to perform control so that the image capturing processing is executed based on the image capturing conditions linked to the image capturing button 131.

Heretofore, the examples of displaying the image capturing buttons 131 and 132 along the right side of the display section 110 have been described, but the embodiment of the present disclosure is not limited to the examples.

FIGS. 26A to 26D are explanatory diagrams illustrating examples of screens displayed in the display section 110 of the image capturing apparatus 100 according to the embodiment of the present disclosure.

FIG. 26A illustrates an example of displaying the image capturing buttons 131 and 132 along the right side of the display section 110 as described above. When the image capturing buttons 131 and 132 are displayed in this way, it is difficult for a left-handed user to touch the image capturing buttons 131 and 132. In this respect, the image capturing apparatus 100 may cause the control section 116 to perform control so that the image capturing buttons 131 and 132 are displayed along the left side of the display section 110. FIG. 26B illustrates an example of displaying the image capturing buttons 131 and 132 along the left side of the display section 110.

Heretofore, the descriptions have been given of the display examples of the case where the display section 110 is placed in the landscape direction. In addition, a description is given of a display example of the case where the display section 110 is placed in the portrait direction after the user changes the posture of the display section 110.

FIG. 26C illustrates the display example of the case where the display section 110 is placed in the portrait direction. When the display section 110 is placed in the landscape direction, an EE image is displayed in the portrait direction, and the image capturing buttons 131 and 132 are displayed along the right side of the display section 110. Also when the display section 110 is placed in the portrait direction, the image capturing apparatus 100 may cause the control section 116 to perform control so that the image capturing buttons 131 and 132 are displayed along the left side of the display section 110 for a left-handed user, as described above. FIG. 26D illustrates an example of the case where the image capturing buttons 131 and 132 are displayed along the left side of the display section 110 when the display section 110 is placed in the portrait direction.

In the foregoing descriptions, the image capturing apparatus 100 causes the user to manipulate the image capturing buttons 131 and 132 displayed in the display section 110 to thereby cause the user to set the image capturing condition or execute the image capturing processing. However, hard keys corresponding to the icons may be provided with functions of setting the image capturing condition and executing the image capturing processing.

FIG. 27 is an explanatory diagram illustrating an example of a screen displayed in the display section 110 of the image capturing apparatus 100 according to the embodiment of the present disclosure. FIG. 27 also illustrates that the image capturing apparatus 100 is provided with input sections 126*a* and 126*b* corresponding to the image capturing buttons 131 and 132, respectively.

In the foregoing description, when the user touches an EE image displayed in the display section 110 and then touches the image capturing button 131 or 132, the image capturing apparatus 100 thereby executes the image capturing processing or displays the setting item menu of the image capturing conditions in the display section 110, depending on the touch timing. When the user's input manipulation is performed on an input section 126*a* or 126*b* instead of the touch on the image capturing button 131 or 132, the image capturing apparatus 100 may also execute the image capturing processing or display the setting item menu of the image capturing conditions in the display section 110, depending on the touch timing.

The image capturing apparatus 100 according to the embodiment of the present disclosure is capable of capturing a still image during recording of a moving image in the nonvolatile memory section 122. The image capturing apparatus 100 is capable of causing the user to easily capture a still image during recording of a moving image by causing the user to touch the image capturing button displayed in the display section 110.

FIG. 28 is an explanatory diagram illustrating an example of the case where the image capturing apparatus 100 according to the embodiment of the present disclosure captures a still image during recording of a moving image. FIG. 28 illustrates not only an example of images displayed in the display section 110 of the image capturing apparatus 100 but also how a still image is captured during the recording of a moving image, by using a temporal axis.

When the user touches an EE image displayed in the display section 110 and then touches the image capturing button 132 within the predetermined time, the image capturing apparatus 100 starts image capturing processing of a moving image based on the image capturing conditions linked to the image capturing button 132. Then, when the user touches the image capturing button 131 during the image capturing processing of the moving image executed by the image capturing apparatus 100, the image capturing apparatus 100 executes image capturing processing of a still image based on the image capturing conditions linked to the image capturing button 131 while continuing the image capturing processing of the moving image.

As described above, the image capturing apparatus 100 according to the embodiment of the present disclosure causes the user to touch the plurality of image capturing buttons 131 and 132, and thereby enables flexible photographing.

FIG. 28 illustrates the case of recording a still image during recording of the moving image. However, also in the case of capturing a plurality of moving images in parallel, the image capturing apparatus 100 according to the embodiment of the present disclosure enables flexible photographing by causing the user to touch a plurality of image capturing buttons.

FIG. 29 is an explanatory diagram illustrating an example in the case where the image capturing apparatus 100 according to the embodiment of the present disclosure records a moving image while recording another moving image. FIG. 29 illustrates not only an example of images displayed in the display section 110 of the image capturing apparatus 100 but also how a moving image is recorded while recording another moving image, by using the temporal axis.

When the user touches an EE image displayed in the display section 110 and then touches the image capturing button 132a within the predetermined time, the image capturing apparatus 100 starts image capturing processing of a moving image based on the image capturing conditions linked to the image capturing button 132a. Then, when the user touches the image capturing button 132b during image capturing processing of the moving image executed by the image capturing apparatus 100, the image capturing apparatus 100 executes the image capturing processing of the moving image based on the image capturing conditions linked to the image capturing button 132b while continuing the image capturing processing of the moving image.

As described above, the image capturing apparatus 100 according to the embodiment of the present disclosure enables flexible photographing by causing the user to touch the plurality of image capturing buttons 132a and 132b.

The operation examples of the image capturing apparatus 100 according to the embodiment of the present disclosure have heretofore been described. Note that although the foregoing descriptions have been given by taking an example of the image capturing apparatus 100, the embodiment of the present disclosure is applicable to any apparatus, as long as the apparatus is capable of controlling image capturing operation. Examples of such an apparatus include a display apparatus, an image recording apparatus, a game machine, a personal computer, a PDA, a mobile music reproducing apparatus, and other mobile terminals.

<3. Conclusion>

As described above, the image capturing apparatus 100 according to the embodiment of the present disclosure makes it possible to display an image capturing button displayed as a handler in the display section 110 in association with setting of a photographing condition. The user can easily capture an image based on the image capturing conditions set in advance by using a touch or the like on the image capturing button displayed in the display section 110.

The image capturing apparatus 100 according to the embodiment of the present disclosure can display the photographing condition and related information together in a portion manipulated in photographing in the display section 110. Displaying the photographing condition and the related information together in the display section 110 makes it possible to make the user easily know correspondence between an image capturing condition and an image capturing button.

The image capturing apparatus 100 according to the embodiment of the present disclosure can display a plurality of image capturing buttons concurrently in the display section 110. Simply selecting one of the image capturing buttons in photographing enables the user to concurrently perform changing of the photographing condition set in advance and photographing, and to independently perform manipulations for recording a plurality of moving images, e.g., while a moving image is being recorded, another image in different size is recorded.

In addition, with the image capturing apparatus 100 according to the embodiment of the present disclosure, the user does not have to perform special manipulation for setting an image capturing condition. It is not necessary to concurrently perform photographing having a limited degree of freedom of photographing timing and selecting one of setting items of individual conditions, unlike the related art.

Steps of processing executed by each section in the specification do not necessarily have to be performed in time-series in the order of steps described in a sequence diagram or each flowchart. For example, the steps of the processing executed by each section may be performed in the order different from that described in the flowchart or performed in parallel.

In addition, it is possible to generate computer programs for causing hardware such as a CPU, a ROM, or a RAM built in the corresponding section to exert functions equivalent to those in the configuration of the aforementioned sections. It is also possible to provide a recording medium in which the computer programs are stored. Moreover, configuring each functional block illustrated in the functional block diagram by hardware makes it possible to implement a series of processes of the functional block by hardware.

It should be understood by those skilled in the art that various modifications, combinations, sub-combinations and alterations may occur depending on design requirements and other factors insofar as they are within the scope of the appended claims or the equivalents thereof.

The present disclosure may be configured as below.

(1) An information processing system including circuitry configured to detect that a first user input is received at a user interface corresponding to a display configured to display an image captured by an image capturing unit; determine a status of a timer corresponding to the user interface upon detecting the first user input; control an image capture operation of the image capturing unit upon detecting the first input and determining that the status of the timer satisfies a first predetermined condition; and control the display to display an image condition settings menu upon detecting the first input and determining that the status of the timer satisfies a second predetermined condition.

(2) The information processing system of (1), wherein the user interface is a touch panel disposed on, or integrally formed with, the display.

(3) The information processing system of (2), wherein the circuitry is configured to detect that a second user input is received at the touch panel selecting the displayed image.

(4) The information processing system of (3), wherein the circuitry is configured to control a focusing operation corresponding to the image captured by the image capture unit at a position corresponding to the second user input.

(5) The information processing system of any of (3) and (4), wherein the circuitry is configured to start the timer upon detecting that the second user input is received at the touch panel.

(6) The information processing system of any of (1) to (5), wherein the circuitry is configured to control the image capture operation upon detecting the first input and determining that the timer has been started and is within a predetermined time.

(7) The information processing system of any of (1) to (6), wherein the circuitry is configured to control the display to display the image condition settings menu upon detecting the first input and determining that the timer has not yet started or exceeds a predetermined time.

(8) The information processing system of any of (1) to (8), wherein the circuitry is configured to: detect that a second user input is received at a user interface corresponding to the display when the image condition settings menu is displayed; and control the display to stop displaying the image condition settings menu upon detecting the second user input.

(9) The information processing system of any of (2) to (8), wherein the circuitry is configured to: control the display to display an icon corresponding to the image capture operation; and detect, as the first user input, a selection of the icon corresponding to the image capture operation.

(10) The information processing system of (9), wherein the icon indicates image condition settings associated with the icon.

(11) The information processing system of (10), wherein the icon indicates an image size setting corresponding to the image capture operation.

(12) The information processing system of any of (10) to (11), wherein the icon indicates a format setting corresponding to a moving image capture operation.

(13) The information processing system of any of (10) to (13), wherein the icon indicates a remaining amount of recording time or remaining number of still images able to be captured based on a capacity of a memory storing a result of the image capture operation.

(14) The information processing system of any of (10) to (13), wherein the icon indicates a moving image capturing setting or a still image capturing setting.

(15) The information processing system of any of (10) to (14), wherein the circuitry is configured to: detect a dragging user input corresponding to the icon; and control the display to scroll through a plurality of icons, which each indicate different image condition settings.

(16) The information processing system of any of (2) to (15), wherein the circuitry is configured to: control the display to display an icon corresponding to a still image capture operation; detect, as the first user input, a selection of the icon corresponding to the still image capture operation; control a still image capture operation of the image captured by the image capturing unit upon detecting the first input and determining that the status of the timer satisfies a first predetermined condition; and control the display to display an image condition settings menu upon detecting the first input and determining that the status of the timer satisfies a second predetermined condition.

(17) The information processing system of (16), wherein the circuitry is configured to: control the display to replace the icon corresponding to the still image capture operation with an icon corresponding to a moving image capture operation when a moving image option is selected in the image condition settings menu.

(18) The information processing system of any of (2) to (17), wherein the circuitry is configured to: control the display to display an icon corresponding to a moving image capture operation; detect, as the first user input, a selection of the icon corresponding to the moving image capture operation; control a moving image capture operation of the image captured by the image capturing unit upon detecting the first input and determining that the status of the timer satisfies a first predetermined condition; and control the display to display an image condition settings menu upon detecting the first input and determining that the status of the timer satisfies a second predetermined condition.

(19) A method performed by an information processing system, the method including: detecting that a first user input is received at a user interface corresponding to a display configured to display an image captured by an image capturing unit; determining a status of a timer corresponding to the user interface upon detecting the first user input; controlling an image capture operation the image capturing unit upon detecting the first input and determining that the status of the timer satisfies a first predetermined condition; and controlling the display to display an image condition settings menu upon detecting the first input and determining that the status of the timer satisfies a second predetermined condition.

(20) A non-transitory computer-readable medium including computer-program instruction, which when executed by an information processing system, cause the information processing system to: detect that a first user input is received at a user interface corresponding to a display configured to display an image captured by an image capturing unit; determine a status of a timer corresponding to the user interface upon detecting the first user input; control an image capture operation of the image capturing unit upon detecting the first input and determining that the status of the timer satisfies a first predetermined condition; and control the display to display an image condition settings menu upon detecting the first input and determining that the status of the timer satisfies a second predetermined condition.

(21) An image capturing control apparatus including:
a receiving section which receives a signal from a handler which receives a user manipulation; and
a control section which controls recording of a captured image in accordance with a first manipulation of the handler, the recording being performed under a predetermined image capturing condition, and which performs control in a manner that receiving of selection of the image capturing condition is started in accordance with a second manipulation of the handler and in a manner that the selection is decided in accordance with a third manipulation different from the first manipulation.

(22) The image capturing control apparatus according to (21), wherein the control section concurrently displays, in a display section, a plurality of the handlers for each of which a different image capturing condition is set.

(23) The image capturing control apparatus according to (21) or (22), wherein the control section displays a captured image in a display section and receives the first manipulation of the handler after a selection manipulation of the captured image.

(24) The image capturing control apparatus according to (23), wherein the control section displays a plurality of the captured images in the display section and executes processing corresponding to the handler on one of the plurality of captured images which is selected by receiving the first manipulation of the handler after the selection manipulation of the captured image.

(25) The image capturing control apparatus according to (24), wherein the control section concurrently displays, in the display section, a plurality of the handlers supporting any of the plurality of captured images.

(26) The image capturing control apparatus according to any one of (21) to (25), wherein the control section changes display of the handler when a captured image is recorded in accordance with the first manipulation.

(27) The image capturing control apparatus according to any one of (21) to (26), wherein the control section displays the handler as an icon in the display section.

(28) An image capturing control method including:
receiving a signal from a handler which receives a user manipulation; and
controlling recording of a captured image in accordance with a first manipulation of the handler, the recording being performed under a predetermined image capturing condition, and performing control in a manner that receiving of selection of the image capturing condition is started in accordance with a second manipulation of the handler and in a manner that the selection is decided in accordance with a third manipulation different from the first manipulation.

(29) A computer program for causing a computer to execute:
receiving a signal from a handler which receives a user manipulation; and controlling recording of a captured image in accordance with a first manipulation of the handler, the recording being performed under a predetermined image capturing condition, and performing control in a manner that receiving of selection of the image capturing condition is started in accordance with a second manipulation of the handler and in a manner that the selection is decided in accordance with a third manipulation different from the first manipulation.

(30) An image capturing control apparatus including:
a receiving section which receives a signal from a handler which receives a user manipulation; and
a control section which controls recording of a captured image in accordance with a first manipulation of the handler, the recording being performed under a predetermined image capturing condition, and which performs control in a manner that a menu for setting the image capturing condition is displayed in a display section in association with the handler in accordance with a second manipulation of the handler.

(31) The image capturing control apparatus according to (30), wherein the control section concurrently displays, in the display section, a plurality of the handlers for each of which a different image capturing condition is set.

(32) The image capturing control apparatus according to (30) or (31), wherein the control section displays a captured image in the display section and receives the first manipulation of the handler after a selection manipulation of the captured image.

(33) The image capturing control apparatus according to any one of (30) to (32),
wherein the control section displays the handler as an icon in the display section.

(34) An image capturing control method including:
receiving a signal from a handler which receives a user manipulation; and
controlling recording of a captured image in accordance with a first manipulation of the handler, the recording being performed under a predetermined image capturing condition, and performing control in a manner that a menu for setting the image capturing condition is displayed in a display section in association with the handler in accordance with a second manipulation of the handler.

(35) An image capturing control apparatus including:
a receiving section which receives signals from a plurality of handlers for receiving a user manipulation and for controlling recording of captured images under image capturing conditions that are different from each other; and
a control section which displays a plurality of captured images in a display section and performs control in a manner that when a first manipulation of one of the plurality of handlers is received after one of the plurality of captured images displayed in the display section is selected, processing is performed, the processing corresponding to the one of the plurality of handlers which receives the first manipulation of the selected captured image.

(36) An image capturing control method including:
receiving signals from a plurality of handlers for receiving a user manipulation and for controlling recording of captured images under image capturing conditions that are different from each other; and
displaying a plurality of captured images in a display section and performing control in a manner that when a first manipulation of one of the plurality of handlers is received after one of the plurality of captured images displayed in the display section is selected, processing is performed, the processing corresponding to the one of the plurality of handlers which receives the first manipulation of the selected captured image.

REFERENCE SIGNS LIST

100 Image capturing apparatus
102 Image capturing section
104 Image sensor I/F
106 Signal processing preprocessing section
108 Signal processing section
110 Display section
112 Display processing section
114 Posture detection section
116 Control section
118 Volatile memory section
120 Nonvolatile memory I/F
122 Nonvolatile memory section
124 Input processing section
126 Input section

The invention claimed is:
1. An information processing system, comprising
a display unit configured to display an image;
an image capturing unit configured to capture the image; and circuitry configured to:
  detect that a first user input is received at a user interface corresponding to the display unit;
  determine a status of a timer corresponding to the user interface based on the detected first user input;
  control an image capture operation of the image capturing unit based on the detected first user input and determination that the status of the timer satisfies a first condition; and
  control the display unit to display an image condition settings menu based on the detected first user input and determination that the status of the timer satisfies a second condition.

2. The information processing system of claim 1, wherein the user interface is a touch panel on, or integrally with, the display unit.

3. The information processing system of claim 2, wherein the circuitry is configured to detect that a second user input is received at the touch panel to select the displayed image.

4. The information processing system of claim 3, wherein the circuitry is configured to control a focusing operation corresponding to the image captured by the image capturing unit at a position corresponding to the second user input.

5. The information processing system of claim 3, wherein the circuitry is configured to start the timer based on the detected second user input received at the touch panel.

6. The information processing system of claim 1, wherein the circuitry is configured to control the image capture operation based on the detected first user input and determination that the timer has been started and is within a specific time.

7. The information processing system of claim 1, wherein the circuitry is configured to control the display unit to display the image condition settings menu based on the detected first user input and determination that the timer has not yet started or exceeds a specific time.

8. The information processing system of claim 1, wherein the circuitry is configured to:
  detect that a second user input is received at the user interface corresponding to the display unit based on display of the image condition settings menu; and
  control the display unit to stop display of the image condition settings menu based on the detected second user input.

9. The information processing system of claim 2, wherein the circuitry is configured to:
  control the display unit to display an icon corresponding to the image capture operation; and
  detect, as the first user input, a selection of the icon corresponding to the image capture operation.

10. The information processing system of claim 9, wherein the icon indicates image condition settings associated with the icon.

11. The information processing system of claim 10, wherein the icon indicates an image size setting corresponding to the image capture operation.

12. The information processing system of claim 10, wherein the icon indicates a format setting corresponding to a moving image capture operation.

13. The information processing system of claim 10, wherein the icon indicates a remaining amount of recording time or remaining number of still images to be captured based on a capacity of a memory storing a result of the image capture operation.

14. The information processing system of claim 10, wherein the icon indicates a moving image capturing setting or a still image capturing setting.

15. The information processing system of claim 10, wherein the circuitry is configured to:
  detect a dragging user input corresponding to the icon; and
  control the display unit to scroll through a plurality of icons, wherein each of the plurality of icons indicates different image condition settings.

16. The information processing system of claim 2, wherein the circuitry is configured to:
  control the display unit to display an icon corresponding to a still image capture operation;
  detect, as the first user input, a selection of the icon corresponding to the still image capture operation; and
  control the still image capture operation of the image captured by the image capturing unit based on the detected first user input and determination that the status of the timer satisfies the first condition.

17. The information processing system of claim 16, wherein the circuitry is configured to:
  control the display unit to replace the icon corresponding to the still image capture operation with an icon corresponding to a moving image capture operation based on selection of a moving image option in the image condition settings menu.

18. The information processing system of claim 2, wherein the circuitry is configured to:
  control the display unit to display an icon corresponding to a moving image capture operation;
  detect, as the first user input, selection of the icon corresponding to the moving image capture operation; and
  control the moving image capture operation of the image captured by the image capturing unit based on the detected first user input and determination that the status of the timer satisfies the first condition.

19. A method, comprising:
  in an information processing system:
  detecting that a first user input is received at a user interface corresponding to a display unit configured to display an image captured by an image capturing unit;
  determining a status of a timer corresponding to the user interface based on the detected first user input;
  controlling an image capture operation of the image capturing unit based on the detected first user input and determination that the status of the timer satisfies a first condition; and
  controlling the display unit to display an image condition settings menu based on the detected first user input and determination that the status of the timer satisfies a second condition.

20. A non-transitory computer-readable medium including computer executable instructions, which when executed by an information processing system, cause the information processing system to execute operations, the operations comprising:
  detecting that a first user input is received at a user interface corresponding to a display unit configured to display an image captured by an image capturing unit;
  determining a status of a timer corresponding to the user interface based on the detected first user input;
  controlling an image capture operation of the image capturing unit based on the detected first user input and determination that the status of the timer satisfies a first condition; and
  controlling the display unit to display an image condition settings menu based on the detected first user input and determination that the status of the timer satisfies a second condition.

* * * * *